United States Patent
Raghothaman et al.

(10) Patent No.: US 11,678,358 B2
(45) Date of Patent: Jun. 13, 2023

(54) DYNAMIC DOWNLINK REUSE IN A C-RAN

(71) Applicant: CommScope Technologies LLC, Hickory, NC (US)

(72) Inventors: Balaji B. Raghothaman, Chester Springs, PA (US); Stuart D. Sandberg, Acton, MA (US); Purnima Venkata Kompella, Bangalore (IN); Anil Bapat, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/149,294

(22) Filed: Oct. 2, 2018

(65) Prior Publication Data
US 2019/0104527 A1    Apr. 4, 2019

Related U.S. Application Data

(60) Provisional application No. 62/567,658, filed on Oct. 3, 2017.

(51) Int. Cl.
| | | |
|---|---|---|
| *H04W 72/08* | (2009.01) | |
| *H04W 74/08* | (2009.01) | |
| *H04L 5/00* | (2006.01) | |
| *H04W 76/10* | (2018.01) | |
| *H04W 88/08* | (2009.01) | |

(52) U.S. Cl.
CPC ......... *H04W 72/085* (2013.01); *H04L 5/0048* (2013.01); *H04L 5/0058* (2013.01); *H04L 5/0091* (2013.01); *H04W 74/0833* (2013.01); *H04W 76/10* (2018.02); *H04L 5/0053* (2013.01); *H04W 88/085* (2013.01)

(58) Field of Classification Search
None
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 6,882,847 B2 | 4/2005 | Craig et al. |
| 6,985,451 B1 | 1/2006 | Nattiv et al. |
| 7,170,871 B2 | 1/2007 | Eyuboglu et al. |
| 7,200,391 B2 | 4/2007 | Chung et al. |
| 7,242,958 B2 | 7/2007 | Chung et al. |

(Continued)

FOREIGN PATENT DOCUMENTS

| | | |
|---|---|---|
| CN | 1719929 A | 1/2006 |
| CN | 101106766 A | 1/2008 |

(Continued)

OTHER PUBLICATIONS

U.S. Patent and Trademark Office, "Final Office Action", U.S. Appl. No. 16/040,253, dated Jul. 11, 2019, pp. 1-33, Published: US.

(Continued)

*Primary Examiner* — Steve R Young
(74) *Attorney, Agent, or Firm* — Fogg & Powers LLC

(57) ABSTRACT

This disclosure is directed to various ways to dynamically manage the subset of radio points that are used to transmit to user equipment in a C-RAN.

21 Claims, 7 Drawing Sheets

(56) References Cited

U.S. PATENT DOCUMENTS

Figure 1:
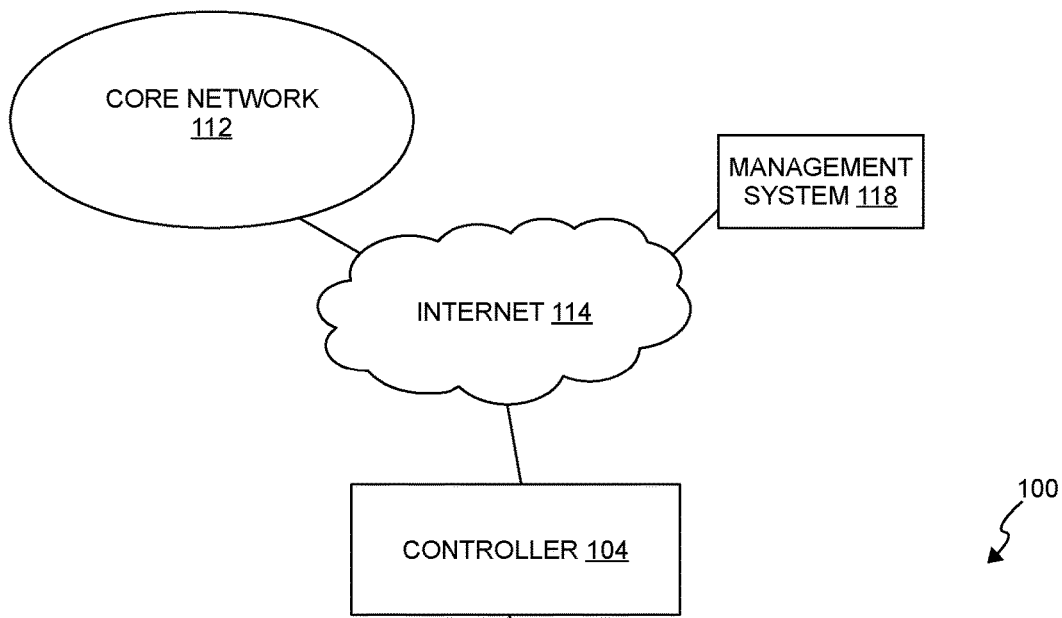
Figure 1:
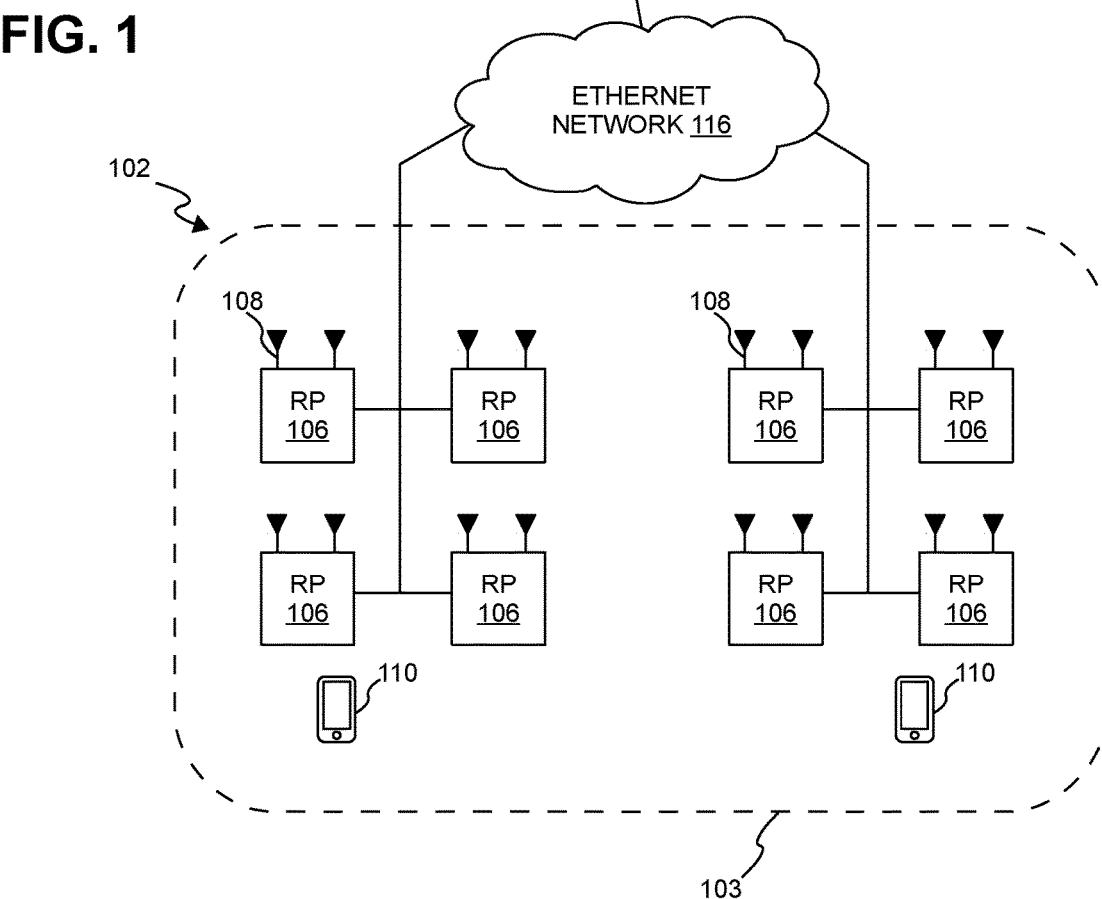

| | | | |
|---|---|---|---|
| 7,260,077 B2* | 8/2007 | Wu | H04W 72/1252 370/337 |
| 7,277,446 B1 | 10/2007 | Abi-Nassif et al. | |
| 7,299,278 B2 | 11/2007 | Ch'ng | |
| 7,415,242 B1 | 8/2008 | Ngan | |
| 7,515,643 B2 | 4/2009 | Chung | |
| 7,558,356 B2 | 7/2009 | Pollman et al. | |
| 7,558,588 B2 | 7/2009 | To et al. | |
| 7,603,127 B2 | 10/2009 | Chung et al. | |
| 7,626,926 B2 | 12/2009 | Abi-Nassif et al. | |
| 7,672,682 B2 | 3/2010 | Sharma et al. | |
| 7,715,466 B1 | 5/2010 | Oh et al. | |
| 7,729,243 B2 | 6/2010 | Ananthaiyer et al. | |
| 7,730,189 B2 | 6/2010 | Harikumar et al. | |
| 7,751,835 B2 | 7/2010 | Sharma et al. | |
| 7,801,487 B2 | 9/2010 | Mehrabanzad et al. | |
| 7,831,257 B2 | 11/2010 | Pollman et al. | |
| 7,835,698 B2 | 11/2010 | Eyuboglu et al. | |
| 7,843,892 B2 | 11/2010 | Mehrabanzad et al. | |
| 7,860,513 B2 | 12/2010 | Chung et al. | |
| 7,907,571 B2 | 3/2011 | Raghothaman et al. | |
| 7,907,950 B2 | 3/2011 | Ihm et al. | |
| 7,920,541 B2 | 4/2011 | To et al. | |
| 7,926,098 B2 | 4/2011 | Chinitz et al. | |
| 7,933,619 B2 | 4/2011 | Kim | |
| 7,934,001 B2 | 4/2011 | Harikumar et al. | |
| 7,953,040 B2 | 5/2011 | Harikumar et al. | |
| 7,983,672 B2 | 7/2011 | Humblet et al. | |
| 7,983,708 B2 | 7/2011 | Mehrabanzad et al. | |
| 7,995,493 B2 | 8/2011 | Anderlind et al. | |
| 8,023,439 B2 | 9/2011 | Rao | |
| 8,060,058 B2 | 11/2011 | Ch'ng et al. | |
| 8,078,165 B2 | 12/2011 | Mate et al. | |
| 8,085,696 B2 | 12/2011 | Garg et al. | |
| 8,094,630 B2 | 1/2012 | Garg et al. | |
| 8,099,504 B2 | 1/2012 | Cherian et al. | |
| 8,111,253 B2 | 2/2012 | Rao | |
| 8,130,686 B2 | 3/2012 | Rao et al. | |
| 8,140,091 B2 | 3/2012 | Chung et al. | |
| 8,145,221 B2 | 3/2012 | Garg et al. | |
| 8,160,020 B2 | 4/2012 | Eyuboglu et al. | |
| 8,160,629 B2 | 4/2012 | Mate et al. | |
| 8,160,631 B2 | 4/2012 | Raghothaman et al. | |
| 8,160,829 B2 | 4/2012 | Kalenine | |
| 8,165,528 B2 | 4/2012 | Raghothaman et al. | |
| 8,170,598 B2 | 5/2012 | Raghothaman et al. | |
| 8,176,327 B2 | 5/2012 | Xiong et al. | |
| 8,194,597 B2 | 6/2012 | Feder et al. | |
| 8,195,187 B2 | 6/2012 | Eyuboglu et al. | |
| 8,229,397 B2 | 7/2012 | Hou et al. | |
| 8,229,498 B2 | 7/2012 | Ch'ng et al. | |
| 8,259,671 B2 | 9/2012 | Raghothaman et al. | |
| 8,280,376 B2 | 10/2012 | Rajagopalan et al. | |
| 8,290,527 B2 | 10/2012 | Richardson | |
| 8,295,256 B2 | 10/2012 | Humblet et al. | |
| 8,295,818 B2 | 10/2012 | Palnati et al. | |
| 8,311,570 B2 | 11/2012 | Richardson | |
| 8,326,342 B2 | 12/2012 | Raghothaman et al. | |
| 8,340,636 B2 | 12/2012 | Yin et al. | |
| 8,345,694 B2 | 1/2013 | Den et al. | |
| 8,346,220 B2 | 1/2013 | Mate et al. | |
| 8,355,727 B2 | 1/2013 | Hoang et al. | |
| 8,358,623 B2 | 1/2013 | Samar et al. | |
| 8,379,566 B2 | 2/2013 | Gao et al. | |
| 8,379,625 B2 | 2/2013 | Humblet | |
| 8,385,291 B2 | 2/2013 | Richardson et al. | |
| 8,400,989 B2 | 3/2013 | Ch'ng et al. | |
| 8,402,143 B2 | 3/2013 | Ramaswamy et al. | |
| 8,428,601 B2 | 4/2013 | Samar et al. | |
| 8,452,299 B2 | 5/2013 | Raghothaman | |
| 8,457,084 B2 | 6/2013 | Valmikam et al. | |
| 8,503,342 B2 | 8/2013 | Richardson | |
| 8,520,659 B2 | 8/2013 | Humblet | |
| 8,532,658 B2 | 9/2013 | Knisely | |
| 8,542,707 B2 | 9/2013 | Hou et al. | |
| 8,543,139 B2 | 9/2013 | Samar et al. | |
| 8,554,231 B2 | 10/2013 | Jones | |
| 8,594,663 B2 | 11/2013 | Ch'ng et al. | |
| 8,599,711 B2 | 12/2013 | Hugl et al. | |
| 8,615,238 B2 | 12/2013 | Eyuboglu et al. | |
| 8,615,593 B2 | 12/2013 | Ch'ng et al. | |
| 8,619,702 B2 | 12/2013 | Garg et al. | |
| 8,639,247 B2 | 1/2014 | Ng et al. | |
| 8,676,729 B1* | 3/2014 | Keralapura | H04L 63/1416 706/12 |
| 8,688,809 B2 | 4/2014 | Ch'ng et al. | |
| 8,693,987 B2 | 4/2014 | Chiussi et al. | |
| 8,705,483 B2 | 4/2014 | Liu | |
| 8,718,697 B2 | 5/2014 | Srinivas et al. | |
| 8,731,574 B2 | 5/2014 | Ch'ng et al. | |
| 8,744,374 B2 | 6/2014 | Aue et al. | |
| 8,750,271 B2 | 6/2014 | Jones | |
| 8,774,134 B2 | 7/2014 | Raghothaman et al. | |
| 8,781,483 B2 | 7/2014 | Ch'ng | |
| 8,805,371 B2 | 8/2014 | Richardson et al. | |
| 8,843,638 B2 | 9/2014 | Garg et al. | |
| 8,873,512 B2 | 10/2014 | Richardson et al. | |
| 8,886,249 B2 | 11/2014 | Richardson | |
| 8,909,278 B2 | 12/2014 | Rao et al. | |
| 8,942,136 B2 | 1/2015 | Humblet | |
| 8,953,566 B2 | 2/2015 | Hegde et al. | |
| 8,958,809 B2 | 2/2015 | Nama et al. | |
| 8,982,841 B2 | 3/2015 | Srinivasan | |
| 9,078,284 B2 | 7/2015 | Richardson | |
| 9,380,466 B2 | 6/2016 | Eyuboglu et al. | |
| 9,414,399 B2 | 8/2016 | Eyuboglu et al. | |
| 9,743,258 B1* | 8/2017 | Elsherif | H04W 24/02 |
| 9,877,340 B1 | 1/2018 | Park et al. | |
| 9,936,470 B2 | 4/2018 | Eyuboglu et al. | |
| 9,998,310 B2 | 6/2018 | Barbieri et al. | |
| 10,057,916 B2 | 8/2018 | Barabell et al. | |
| 10,064,019 B2 | 8/2018 | Gustafson et al. | |
| 10,064,072 B2 | 8/2018 | Eyuboglu et al. | |
| 10,084,537 B2 | 9/2018 | Stephens et al. | |
| 10,097,391 B2 | 10/2018 | Fertonani et al. | |
| 10,149,312 B2 | 12/2018 | Yan et al. | |
| 10,320,455 B2 | 6/2019 | Forenza et al. | |
| 10,355,895 B2 | 7/2019 | Barbieri et al. | |
| 10,736,023 B2 | 8/2020 | Sun et al. | |
| 2002/0128009 A1 | 9/2002 | Boch et al. | |
| 2002/0154055 A1 | 10/2002 | Davis et al. | |
| 2002/0194605 A1 | 12/2002 | Cohen et al. | |
| 2004/0136373 A1 | 7/2004 | Bareis | |
| 2004/0143442 A1 | 7/2004 | Knight | |
| 2004/0146072 A1 | 7/2004 | Farmwald | |
| 2004/0224637 A1 | 11/2004 | Silva et al. | |
| 2005/0025160 A1 | 2/2005 | Meier et al. | |
| 2005/0073964 A1 | 4/2005 | Schmidt et al. | |
| 2005/0157675 A1 | 7/2005 | Feder et al. | |
| 2006/0056459 A1 | 3/2006 | Stratton et al. | |
| 2006/0056559 A1 | 3/2006 | Pleasant et al. | |
| 2006/0209752 A1 | 9/2006 | Wijngaarden et al. | |
| 2007/0023419 A1 | 2/2007 | Ptasienski et al. | |
| 2007/0058683 A1 | 3/2007 | Futami et al. | |
| 2007/0086487 A1 | 4/2007 | Yasuda et al. | |
| 2007/0140218 A1 | 6/2007 | Nair et al. | |
| 2007/0207838 A1 | 9/2007 | Kuwahara et al. | |
| 2007/0220573 A1 | 9/2007 | Chiussi et al. | |
| 2007/0230419 A1 | 10/2007 | Raman et al. | |
| 2007/0242648 A1 | 10/2007 | Garg et al. | |
| 2007/0297412 A1 | 12/2007 | Feng | |
| 2008/0003988 A1 | 1/2008 | Richardson | |
| 2008/0137606 A1 | 6/2008 | Zuniga et al. | |
| 2008/0165883 A1* | 7/2008 | Jiang | H04B 7/0413 375/267 |
| 2008/0200202 A1 | 8/2008 | Montojo et al. | |
| 2008/0233886 A1 | 9/2008 | Kaminski et al. | |
| 2008/0240034 A1 | 10/2008 | Gollamudi | |
| 2009/0097444 A1 | 4/2009 | Lohr et al. | |
| 2009/0135718 A1 | 5/2009 | Yeo et al. | |
| 2009/0149221 A1 | 6/2009 | Liu et al. | |
| 2009/0180423 A1 | 7/2009 | Kroener | |
| 2009/0180435 A1 | 7/2009 | Sarkar | |
| 2009/0265599 A1 | 10/2009 | Chae et al. | |

(56) References Cited

U.S. PATENT DOCUMENTS

| | | | |
|---|---|---|---|
| 2009/0276542 A1 | 11/2009 | Aweya et al. |
| 2009/0287976 A1 | 11/2009 | Wang et al. |
| 2009/0300453 A1 | 12/2009 | Sahara |
| 2009/0316626 A1 | 12/2009 | Lee et al. |
| 2009/0327829 A1 | 12/2009 | Yang et al. |
| 2010/0011269 A1 | 1/2010 | Budianu et al. |
| 2010/0011271 A1 | 1/2010 | Giancola et al. |
| 2010/0034135 A1 | 2/2010 | Kim et al. |
| 2010/0037115 A1 | 2/2010 | Zheng |
| 2010/0062768 A1 | 3/2010 | Lindqvist et al. |
| 2010/0069112 A1 | 3/2010 | Sun et al. |
| 2010/0115367 A1 | 5/2010 | Hsu |
| 2010/0118777 A1 | 5/2010 | Yamada et al. |
| 2010/0142494 A1 | 6/2010 | Hsu |
| 2010/0167718 A1 | 7/2010 | Chiussi et al. |
| 2010/0169732 A1 | 7/2010 | Wu |
| 2010/0178875 A1 | 7/2010 | Oh et al. |
| 2010/0185911 A1 | 7/2010 | Cheng |
| 2010/0234035 A1 | 9/2010 | Fujishima et al. |
| 2010/0246513 A1 | 9/2010 | Lindskog et al. |
| 2010/0257419 A1 | 10/2010 | Sung et al. |
| 2011/0041136 A1* | 2/2011 | Messier ............... G06F 9/5066 |
| | | | 718/105 |
| 2011/0081930 A1 | 4/2011 | Shimonabe et al. |
| 2011/0116393 A1 | 5/2011 | Hong et al. |
| 2011/0134862 A1 | 6/2011 | Huang et al. |
| 2011/0145672 A1 | 6/2011 | Jongren et al. |
| 2011/0170517 A1 | 7/2011 | Bakker et al. |
| 2011/0182255 A1 | 7/2011 | Kim et al. |
| 2011/0194548 A1 | 8/2011 | Feder et al. |
| 2011/0194630 A1 | 8/2011 | Yang et al. |
| 2011/0207415 A1 | 8/2011 | Luo et al. |
| 2011/0268007 A1 | 11/2011 | Barany et al. |
| 2011/0268028 A1 | 11/2011 | Stern-Berkowitz et al. |
| 2011/0287791 A1 | 11/2011 | Fujishima et al. |
| 2011/0310802 A1 | 12/2011 | Song et al. |
| 2012/0057572 A1 | 3/2012 | Evans et al. |
| 2012/0127947 A1 | 5/2012 | Usui |
| 2012/0140660 A1 | 6/2012 | Kang et al. |
| 2012/0147815 A1 | 6/2012 | Meyer et al. |
| 2012/0176884 A1 | 7/2012 | Zhang et al. |
| 2012/0176966 A1 | 7/2012 | Ling |
| 2012/0176980 A1 | 7/2012 | Moon et al. |
| 2012/0176996 A1 | 7/2012 | Kim et al. |
| 2012/0188929 A1 | 7/2012 | Zhang et al. |
| 2012/0189074 A1 | 7/2012 | Jin et al. |
| 2012/0195284 A1 | 8/2012 | Mann et al. |
| 2012/0207105 A1 | 8/2012 | Geirhofer et al. |
| 2012/0208581 A1 | 8/2012 | Ishida et al. |
| 2012/0213109 A1 | 8/2012 | Xu et al. |
| 2012/0224541 A1 | 9/2012 | Yoshiuchi et al. |
| 2012/0250520 A1 | 10/2012 | Chen et al. |
| 2012/0250740 A1 | 10/2012 | Ling |
| 2012/0257570 A1 | 10/2012 | Jang et al. |
| 2012/0264470 A1 | 10/2012 | Bajj et al. |
| 2012/0281656 A1 | 11/2012 | Hooli et al. |
| 2012/0300635 A1 | 11/2012 | Jersenius et al. |
| 2012/0300766 A1 | 11/2012 | Chen et al. |
| 2012/0322492 A1 | 12/2012 | Koo et al. |
| 2013/0016686 A1 | 1/2013 | Li et al. |
| 2013/0029711 A1 | 1/2013 | Kang et al. |
| 2013/0034197 A1 | 2/2013 | Aweya et al. |
| 2013/0100948 A1 | 4/2013 | Irvine |
| 2013/0136053 A1 | 5/2013 | Kim et al. |
| 2013/0136104 A1 | 5/2013 | Samar et al. |
| 2013/0170435 A1 | 7/2013 | Dinan |
| 2013/0194985 A1 | 8/2013 | Zetterman et al. |
| 2013/0223307 A1 | 8/2013 | Ohlsson et al. |
| 2013/0223365 A1 | 8/2013 | Choi et al. |
| 2013/0223391 A1 | 8/2013 | Koo et al. |
| 2013/0229992 A1 | 9/2013 | Yue et al. |
| 2013/0242837 A1 | 9/2013 | Yang et al. |
| 2013/0242919 A1 | 9/2013 | Koo et al. |
| 2013/0250869 A1 | 9/2013 | Eriksson |
| 2013/0279452 A1 | 10/2013 | Liu |
| 2013/0281049 A1 | 10/2013 | Lee et al. |
| 2013/0294403 A1 | 11/2013 | Srinivasan |
| 2014/0003389 A1 | 1/2014 | Wang et al. |
| 2014/0031036 A1 | 1/2014 | Koo et al. |
| 2014/0031049 A1 | 1/2014 | Sundaresan et al. |
| 2014/0044057 A1 | 2/2014 | Gaal et al. |
| 2014/0071868 A1 | 3/2014 | Bergquist et al. |
| 2014/0086112 A1 | 3/2014 | Stern-Berkowitz et al. |
| 2014/0126438 A1 | 5/2014 | Zhu et al. |
| 2014/0161070 A1 | 6/2014 | Chang et al. |
| 2014/0162664 A1 | 6/2014 | Stapleton et al. |
| 2014/0177549 A1 | 6/2014 | Knisely |
| 2014/0185532 A1 | 7/2014 | Rao et al. |
| 2014/0211690 A1 | 7/2014 | Nama et al. |
| 2014/0212269 A1 | 7/2014 | Kastner et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2014/0341017 A1 | 11/2014 | Mutikainen et al. |
| 2015/0011219 A1 | 1/2015 | Saily et al. |
| 2015/0085720 A1 | 3/2015 | Gaal et al. |
| 2015/0172023 A1 | 6/2015 | Yang et al. |
| 2015/0193282 A1 | 7/2015 | Blocksome |
| 2015/0256297 A1 | 9/2015 | Yang et al. |
| 2015/0304960 A1 | 10/2015 | Yang et al. |
| 2015/0358982 A1 | 12/2015 | Jeon et al. |
| 2016/0037550 A1* | 2/2016 | Barabell ........... H04W 72/1263 |
| | | | 455/450 |
| 2016/0044548 A1 | 2/2016 | Choi et al. |
| 2016/0227555 A1 | 8/2016 | Haberland et al. |
| 2016/0302088 A1 | 10/2016 | Eyuboglu et al. |
| 2016/0309347 A1 | 10/2016 | Eyuboglu et al. |
| 2016/0345342 A1 | 11/2016 | Eyuboglu et al. |
| 2017/0070961 A1 | 3/2017 | Bharadwaj et al. |
| 2017/0077607 A1 | 3/2017 | Han et al. |
| 2017/0135121 A1 | 5/2017 | Eyuboglu et al. |
| 2017/0163330 A1 | 6/2017 | Raleigh et al. |
| 2017/0188368 A1 | 6/2017 | Cariou et al. |
| 2017/0208525 A1* | 7/2017 | Takahashi ............ H04B 7/0617 |
| 2017/0251430 A1 | 8/2017 | Fazel Sarjoui et al. |
| 2017/0373890 A1 | 12/2017 | Fertonani et al. |
| 2018/0034530 A1 | 2/2018 | Tarlazzi et al. |
| 2018/0287696 A1 | 10/2018 | Barbieri et al. |
| 2018/0309464 A1 | 10/2018 | Mandegaran |
| 2018/0337709 A1* | 11/2018 | Zou ....................... H04L 25/08 |
| 2019/0007246 A1 | 1/2019 | Fertonani et al. |
| 2019/0069190 A1 | 2/2019 | Eyuboglu et al. |
| 2019/0075576 A1 | 3/2019 | Eyuboglu et al. |
| 2019/0081688 A1 | 3/2019 | Deenoo et al. |
| 2019/0116568 A1 | 4/2019 | Fertonani et al. |
| 2019/0191464 A1 | 6/2019 | Loehr et al. |
| 2019/0200248 A1 | 6/2019 | Mallick et al. |
| 2019/0208575 A1 | 7/2019 | Barbieri et al. |
| 2019/0357232 A1 | 11/2019 | Raghothaman et al. |
| 2020/0092901 A1* | 3/2020 | Barabell ........... H04W 72/1263 |
| 2020/0359383 A1* | 11/2020 | Lemson .................. H04L 45/56 |

FOREIGN PATENT DOCUMENTS

| | | |
|---|---|---|
| CN | 101534507 A | 9/2009 |
| CN | 101785352 A | 7/2010 |
| CN | 101945399 A | 1/2011 |
| CN | 102111180 A | 6/2011 |
| CN | 102340823 A | 2/2012 |
| CN | 103369582 A | 10/2013 |
| CN | 103430473 A | 12/2013 |
| CN | 103891394 A | 6/2014 |
| CN | 105636213 A | 6/2016 |
| CN | 106797641 A | 5/2017 |
| CN | 107113146 A | 8/2017 |
| CN | 108541360 A | 9/2018 |
| EP | 1134935 A2 | 9/2001 |
| EP | 2352264 A1 | 8/2011 |
| EP | 2605600 A1 | 6/2013 |
| EP | 2693653 A1 | 2/2014 |
| EP | 2787646 A1 | 10/2014 |
| EP | 3094155 A1 | 11/2016 |
| EP | 3269118 A2 | 1/2018 |
| WO | 2008144363 A3 | 11/2008 |

(56) References Cited

FOREIGN PATENT DOCUMENTS

| WO | 2010078811 A1 | 7/2010 |
| WO | 2013036029 A1 | 3/2013 |
| WO | 2014124160 A2 | 8/2014 |
| WO | 2015191530 A2 | 12/2015 |
| WO | 2016145371 A2 | 9/2016 |
| WO | 2017070635 A1 | 4/2017 |
| WO | 2017100096 A1 | 6/2017 |
| WO | 2018017468 A1 | 1/2018 |

OTHER PUBLICATIONS

"3rd Generation Partnership Project; Technical Specification Group Radio Access Network; Evolved Universal Terrestrial Radio Access (E-UTRA); Requirements for support of radio resource management", 3GPP, Mar. 2008, pp. 1-25, 3GPP Organizational Partners.

"3rd Generation Partnership Project; Technical Specification Group Radio Access Network; Evolved Universal Terrestrial Radio Access (E-UTRA); Base Station (BS) radio transmission and reception", 3GPP, Dec. 2007, pp. 1-47, 3GPP Organizational Partners.

"Small Cell Virtualization Functional Splits and Use Cases", Small Cell Forum, Jun. 2015, pp. 1-58, www.smallcellforum.com.

Australian Government IP Australia, "Examination Report from AU Application No. 2015274867 dated Sep. 24, 2018", from Foreign Counterpart to PCT Application No. PCT/US2015/034829, dated Sep. 24, 2018, pp. 1-3, Published: AU.

Belhouchet et al., "4G Wireless Systems, LTE Technology, Session 3: LTE Overview—Design Targets and Multiple Access Technologies", ITU/BDT Arab Regional Workshop, 2010, pp. 1-82, ERT.

Dotsch, et al., "Quantitative Analysis of Split Base Station Processing and Determination of Advantageous Architectures for LTE", Bell Labs Technical Journal, 2013, pp. 1-24, vol. 18, No. 1, Wiley Periodicals.

European Patent Office, "Communication pursuant to Article 94(3) from EP Application No. 15731443.6 dated Mar. 21, 2018", from Foreign Counterpart to U.S. Appl. No. 14/734,311, dated Mar. 21, 2018, pp. 1-7, Published: EP.

Garner, "IEEE 1588 Version 2", ISPCS, Sep. 24, 2008, pp. 1-89.

Haberland et al., "Base Stations in the Cloud", Alcatel-Lucent, Sep. 28, 2012, pp. 1-23, www.alcatel-lucent.com.

International Bureau, "Notification Concerning the Transmittal of International Preliminary Report on Patentability from PCT Application No. PCT/US2015/034829 dated Dec. 22, 2016", from Foreign Counterpart to U.S. Appl. No. 14/734,311, dated Dec. 22, 2016, pp. 1-11, Published: Switzerland.

International Searching Authority, "International Search Report from PCT Application No. PCT/US2015/034829 dated Dec. 8, 2015", from Foreign Counterpart to U.S. Appl. No. 14/734,311, dated Dec. 8, 2015, pp. 1-14, Published: EP.

International Searching Authority, "Invitation to Pay Additional Fees from PCT Application No. PCT/US2015/034829 dated Oct. 1, 2015", from Foreign Counterpart to U.S. Appl. No. 14/734,311, dated Oct. 1, 2015, pp. 1-6, Published: EP.

Ma et al., "RADIOSTAR: Providing Wireless Coverage Over Gigabit Ethernet", Bell Labs Technical Journal, 2009, pp. 1-18, vol. 14, No. 1, Wiley Periodicals.

U.S. Patent and Trademark Office, "Advisory Action", U.S. Appl. No. 14/734,311, dated Jun. 20, 2017, pp. 1-2, Published: US.

U.S. Patent and Trademark Office, "Examiner-Initiated Interview Summary", U.S. Appl. No. 14/734,311, dated Mar. 23, 2017, p. 1, Published: US.

U.S. Patent and Trademark Office, "Final Office Action", U.S. Appl. No. 14/734,311, dated Apr. 7, 2017, pp. 1-53, Published: US.

U.S. Patent and Trademark Office, "Notice of Allowability", U.S. Appl. No. 14/734,311, dated May 1, 2018, pp. 1-8, Published: US.

U.S. Patent and Trademark Office, "Notice of Allowance", U.S. Appl. No. 14/734,311, dated Apr. 19, 2018, pp. 1-12, Published: US.

U.S. Patent and Trademark Office, "Notice of Allowance", U.S. Appl. No. 14/734,311, dated Aug. 23, 2017, pp. 1-19, Published: US.

U.S. Patent and Trademark Office, "Notice of Allowance", U.S. Appl. No. 14/734,311, dated Dec. 14, 2017, pp. 1-14, Published: US.

U.S. Patent and Trademark Office, "Office Action", U.S. Appl. No. 14/734,311, dated Jul. 14, 2016, pp. 1-66, Published: US.

Zhu et al., "Virtual Base Station Pool: Towards a Wireless Network Cloud for Radio Access Networks", May 17, 2010, pp. 1-10.

U.S. Patent and Trademark Office, "Office Action", U.S. Appl. No. 16/040,253, dated Feb. 1, 2019, pp. 1-68, Published: US.

Australian Government IP Australia, "Notice of Acceptance for patent application from AU Application No. 2015274867 dated Apr. 16, 2019", from Foreign Counterpart to U.S. Appl. No. 14/734,311, pp. 1-3, Published: AU.

European Patent Office, "Communication pursuant to Article 94(3) from EP Application No. 15731443.6 dated Feb. 5, 2019", from Foreign Counterpart to U.S. Appl. No. 14/734,311, dated Feb. 5, 2019, pp. 1-5, Published: EP.

International Searching Authority, "International Search Report and Written Opinion from PCT Application No. PCT/US2019/032508 dated Aug. 29, 2019", from Foreign Counterpart to U.S. Appl. No. 16/413,360, pp. 1-21, Published: WO.

U.S. Patent and Trademark Office, "Notice of Allowance", U.S. Appl. No. 16/040,253, dated Sep. 18, 2019, pp. 1-17, Published: US.

China National Intellectual Property Administration, "First Office Action from CN Application No. 201580040533.5 dated Jun. 26, 2019", from Foreign Counterpart to U.S. Appl. No. 16/040,253, pp. 1-29, Published: CN.

International Searching Authority, "International Search Report and Written Opinion from PCT Application No. PCT/US2018/053847 dated Feb. 1, 2009", from Foreign Counterpart to U.S. Appl. No. 16/149,294, dated Feb. 1, 2019, pp. 1-11, Published: WO.

China National Intellectual Property Administration, "Second Office Action from CN Application No. 201580040533.5", from Foreign Counterpart to U.S. Appl. No. 14/734,311, dated Jan. 21, 2020, pp. 1-17, Published: CN.

European Patent Office, "Extended European Search Report from EP Application No. 20151997.2", from Foreign Counterpart to U.S. Appl. No. 14/734,311, dated Apr. 17, 2020, pp. 1 through 10, Published: EP.

International Bureau, "International Preliminary Report on Patentability from PCT Application No. PCT/US2018/053847", from Foreign Counterpart to U.S. Appl. No. 16/149,294, dated Apr. 16, 2020, pp. 1 through 7, Published: WO.

China National Intellectual Property Administration, "Rejection Decision from CN Appication No. 201580040533.5", from Foreign Counterpart to U.S. Appl. No. 14/734,311, dated Sep. 3, 2020, pp. 1 through 15, Published: CN.

Intellectual Property India, "Office Action from IN Application No. 201727000804", from Foreign Counterpart to U.S. Appl. No. 14/734,311, dated Sep. 29, 2020, pp. 1 through 7, Published: IN.

U.S. Patent and Trademark Office, "Office Action", U.S. Appl. No. 16/692,860, filed Jan. 21, 2021, pp. 1 through 93, Published: US.

Australian Government IP Australia, "Examination report No. 1 for standard patent application from AU Application No. 2019205993", from Foreign Counterpart to U.S. Appl. No. 14/734,311, dated Jun. 15, 2020, pp. 1 through 4, Published: AU.

Australian Government IP Australia, "Notice of acceptance for patent application from AU Application No. 2019205993", from Foreign Counterpart to U.S. Appl. No. 14/734,311, dated Dec. 3, 2020, pp. 1 through 3, Published: AU.

China National Intellectual Property Administration, "Third Office Action from CN Application No. 201580040533.5", from Foreign Counterpart to U.S. Appl. No. 14/734,311, dated Feb. 5, 2021, pp. 1 through 17, Published: CN.

International Bureau, "International Preliminary Report on Patentability from PCT Application No. PCT/US2019/032508", from Foreign Counterpart to U.S. Appl. No. 16/413,360, dated Nov. 26, 2020, pp. 1 through 13, Published: WO.

U.S. Patent and Trademark Office, "Notice of Allowance", U.S. Appl. No. 16/413,360, dated Nov. 25, 2020, pp. 1 through 19, Published: US.

U.S. Patent and Trademark Office, "Office Action", U.S. Appl. No. 16/413,360, dated Jul. 14, 2020, pp. 1 through 50, Published: US.

(56) References Cited

OTHER PUBLICATIONS

European Patent Office, "Extended European Search Report from EP Application No. 18864237.5", from Foreign Counterpart to U.S. Appl. No. 16/149,294, dated Jun. 1, 2021, pp. 1 through 5, Published: EP.

Australian Government IP Australia, "Examination report No. 1 for standard patent application from AU Application No. 2021201369", from Foreign Counterpart to U.S. Appl. No. 16/692,860, dated Nov. 4, 2021, pp. 1 through 2, Published: AU.

European Patent Office, "Extended European Search Report from EP Application No. 19803808.5", from Foreign Counterpart to U.S. Appl. No. 16/413,360, dated Dec. 17, 2021, pp. 1 through 14, Published: EP.

U.S. Patent and Trademark Office, "Notice of Allowance", U.S. Appl. No. 16/413,360, dated Dec. 15, 2021, pp. 1 through 14, Published: US.

Canadian Intellectual Property Office, "Office Action" from CA Application No. 2,951,548, from Foreign Counterpart to U.S. Appl. No. 14/734,311, dated Feb. 9, 2022, pp. 1 through 6, Published: CA.

Intellectual Property India "Office Action" from IN Application No. 202128013444, from Foreign counterpart to U.S. Appl. No. 14/734,311, dated Feb. 24, 2022, pp. 1 through 5, Published: IN.

Intellectual Property India "Office Action" from IN Application No. 202128013669, from Foreign counterpart to U.S. Appl. No. 14/734,311, dated Feb. 24, 2022, pp. 1 through 5, Published: IN.

European Patent Office, "Extended European Search Report from EP Application No. 21202770.0", from Foreign Counterpart to U.S. Appl. No. 13/762,283, dated Mar. 14, 2022, pp. 1 through 15, Published: EP.

Fujitsu, "Standardisation impact of antenna virtualization schemes in DL JP CoMP", R1-112659, 3GPP TSG RAN WG1 meeting #66, Athens, Greece, Aug. 22-26, 2011, pp. 1 through 5.

Namba et al., "Colony-RAN Architecture for Future Cellular Network", Future Network & MobileSummit 2012 Conference Proceedings, Jul. 4, 2012, pp. 1 through 8, IIMC International Information Management Corporation, 2012.

Newpostcom, "Uplink control signaling for CoMP scenario", 3GPP TSG RAN WG1 Meeting #68bis, R1-121341, Jeju, Korea, Mar. 26-30, 2012, pp. 1 through 6.

Australian Government IP Australia, "Notice of acceptance for patent application", from AU Application No. 2021201369, dated Mar. 15, 2022 from Foreign Counterpart to U.S. Appl. No. 14/734,311, pp. 1 through 3, Published AU.

European Patent Office, "Communication under Rule 71(3) EPC", from EP Application No. 18864237.5, dated Feb. 23, 2022, from Foreign Counterpart to U.S. Appl. No. 16/149,294, pp. 1 through 52, Published: EP.

3GPP TSG RAN RP-160354, "Summary of [5G-AH-03] Resolve square brackets for the deployment scenarios and KPI values in the TR", Gothenburg, Sweden, Mar. 7-10, 2016, pp. 1 through 75.

He et al., "SNR Threshold for Distributed Antenna Systems in Cloud Radio Access Networks", 2015 IEEE 82nd vehicular technology conference (VTC2015-FALL), Sep. 9, 2015, downloaded Jan. 12, 2023 from IEEE Xplore, pp. 1 through 5.

Song, Chuanlei, "Research on downlink precoding technology in distributed antenna system", Thesis submitted to Southeast University, May 2, 2016, pp. Cover through 71.

State Intellectual Property Office, P.R. China, "Notice to Grant", from CN Application No. 201880064719.8, dated Jan. 5, 2023, from Foreign Counterpart to U.S. Appl. No. 16/149,294, pp. 1 through 7, Published: CN.

\* cited by examiner

DYNAMIC DOWNLINK REUSE IN A C-RAN

REFERENCE TO RELATED APPLICATION

This application claims the benefit of U.S. Provisional Patent Application Ser. No. 62/567,658, filed on Oct. 3, 2017, which is hereby incorporated herein by reference in its entirety.

BACKGROUND

A centralized radio access network (C-RAN) is one way to implement base station functionality. Typically, for each cell implemented by a C-RAN, a single baseband unit (BBU) interacts with multiple remote units (also referred to here as "radio points" or "RPs") in order to provide wireless service to various items of user equipment (UEs).

As used here, "reuse" refers to situations where separate downlink data intended for multiple UEs is simultaneously transmitted to the UEs using the same resource elements (that is, the same time-frequency resource). Typically, these situations arise when the UEs are sufficiently physically separated from each other so that the different downlink transmissions do not interfere with each other when transmitted from differing subsets of RPs. This type of reuse is also referred to as "spatial reuse."

Conventional techniques for implementing spatial reuse are often relatively simplistic or conservative, which can result in relatively few opportunities to employ spatial reuse, in spatial reuse being employed in inappropriate situations (for example, due to one or more of the UEs moving), and/or spatial resource degrading overall system performance.

SUMMARY

One embodiment is directed a system to provide wireless service. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) using a cell. The controller is communicatively coupled to a core network of a wireless service provider. The system is configured to transmit at least some data to each UE connected to the cell using a respective subset of the radio points. The system is configured to determine the respective subset of the radio points for transmitting to each UE connected to the cell using a signature vector comprising a set of signal reception metrics, each signal reception metric associated with a respective one of the radio points and indicative of the reception of a signal transmitted from the respective UE at one of the radio points. The system is configured to do the following when each UE establishes a new connection with the cell: determine initial signal reception metrics for that UE; and if the system has a stored signature vector associated with that UE and that stored signature vector matches the initial signal reception metrics for that UE, initialize the signature vector for that UE using that stored signature associated with that UE.

Another embodiment is directed to a system to provide wireless service. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) using a cell. The controller is communicatively coupled to a core network of a wireless service provider. The system is configured to do the following for each UE connected to the cell: determine a signature vector comprising a set of signal reception metrics, each signal reception metric associated with a respective one of the radio points and indicative of the reception of a signal transmitted from the respective UE at one of the radio points; determine a respective minimum subset of the radio points for transmitting to that UE; determine a respective maximum subset of the radio points for transmitting to that UE; and determine a respective current subset of the radio points for transmitting to that UE based on, at least, the signature vector, the respective minimum subset of the radio points for transmitting to that UE, and the respective maximum subset of the radio points for transmitting to that UE. The system is configured to, for each UE connected to the cell, expand the number of radio points in the minimum subset of the radio points if the respective signature vector for that UE has not been updated at least a predetermined number of times. The system is configured to wirelessly transmit at least some data to each UE connected to the cell using the respective current subset of the radio points determined for that UE based.

Another embodiment is directed to a system to provide wireless service. The system comprises a controller and a plurality of radio points. Each of the radio points is associated with at least one antenna and remotely located from the controller, wherein the plurality of radio points is communicatively coupled to the controller. The controller and the plurality of radio points are configured to implement a base station in order to provide wireless service to a plurality of user equipment (UEs) using a cell. The controller is communicatively coupled to a core network of a wireless service provider. The system is configured to do the following for each UE connected to the cell: determine a signature vector comprising a set of signal reception metrics, each signal reception metric associated with a respective one of the radio points and indicative of the reception at one of the radio points of a signal transmitted from the respective UE; determine a respective minimum subset of the radio points for transmitting to that UE; determine a respective maximum subset of the radio points for transmitting to that UE; and determine a respective current subset of the radio points for transmitting to that UE based on, at least, the signature vector, the respective minimum subset of the radio points for transmitting to that UE, and the respective maximum subset of the radio points for transmitting to that UE. The system is configured to, for each UE connected to the cell, update the respective current subset of the radio points used to transmit that UE based on at least one of the following: at least one ratio of the actual rate of throughput for at least one UE connected to the cell and an estimated rate of throughput for said at least one UE connected to the cell; at least one processing load at the radio points; and demand from at least one UE connected to the cell to use at least one radio point. The system is configured to wirelessly transmit at least some data to each UE connected to the cell using the respective current subset of the radio points determined for that UE.

DRAWINGS

FIG. 1 is a block diagram illustrating one exemplary embodiment of a radio access network (RAN) system in which the dynamic reuse techniques described here can be implemented.

Figure 2:
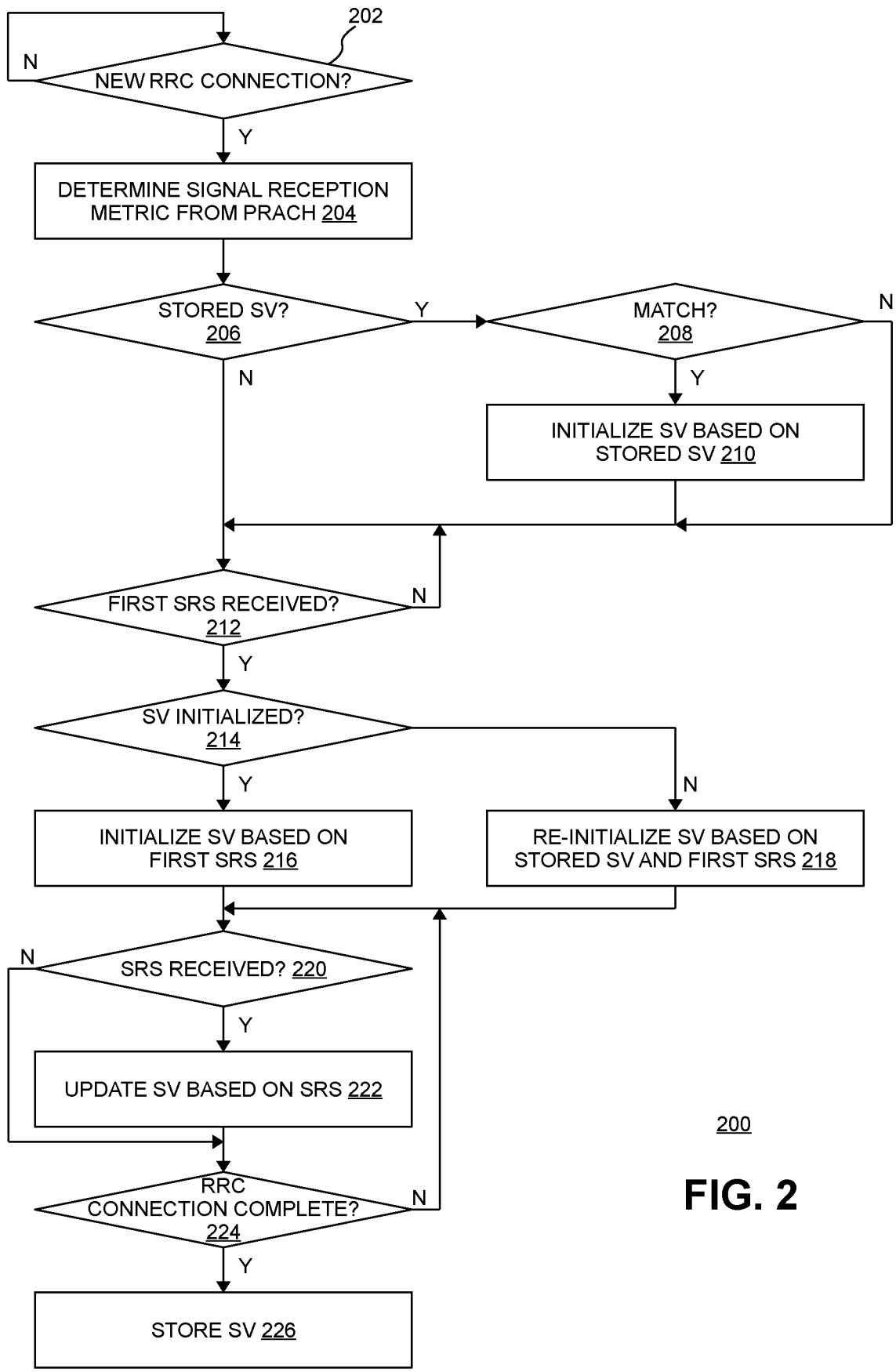

FIG. 2 comprises a flow chart illustrating one exemplary embodiment of a method of dynamically maintaining a signature vector in a C-RAN.

Figure 3:
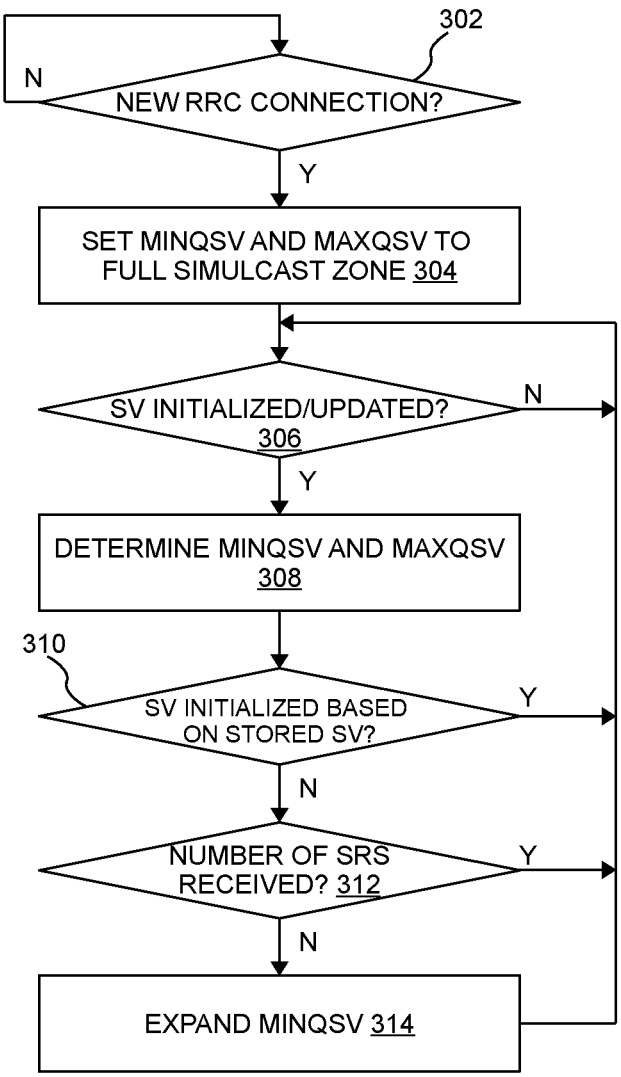

FIG. 3 comprises a flow chart illustrating one exemplary embodiment of a method of determining a minimum simulcast zone and a maximum simulcast zone for a UE in a C-RAN.

Figure 4A:
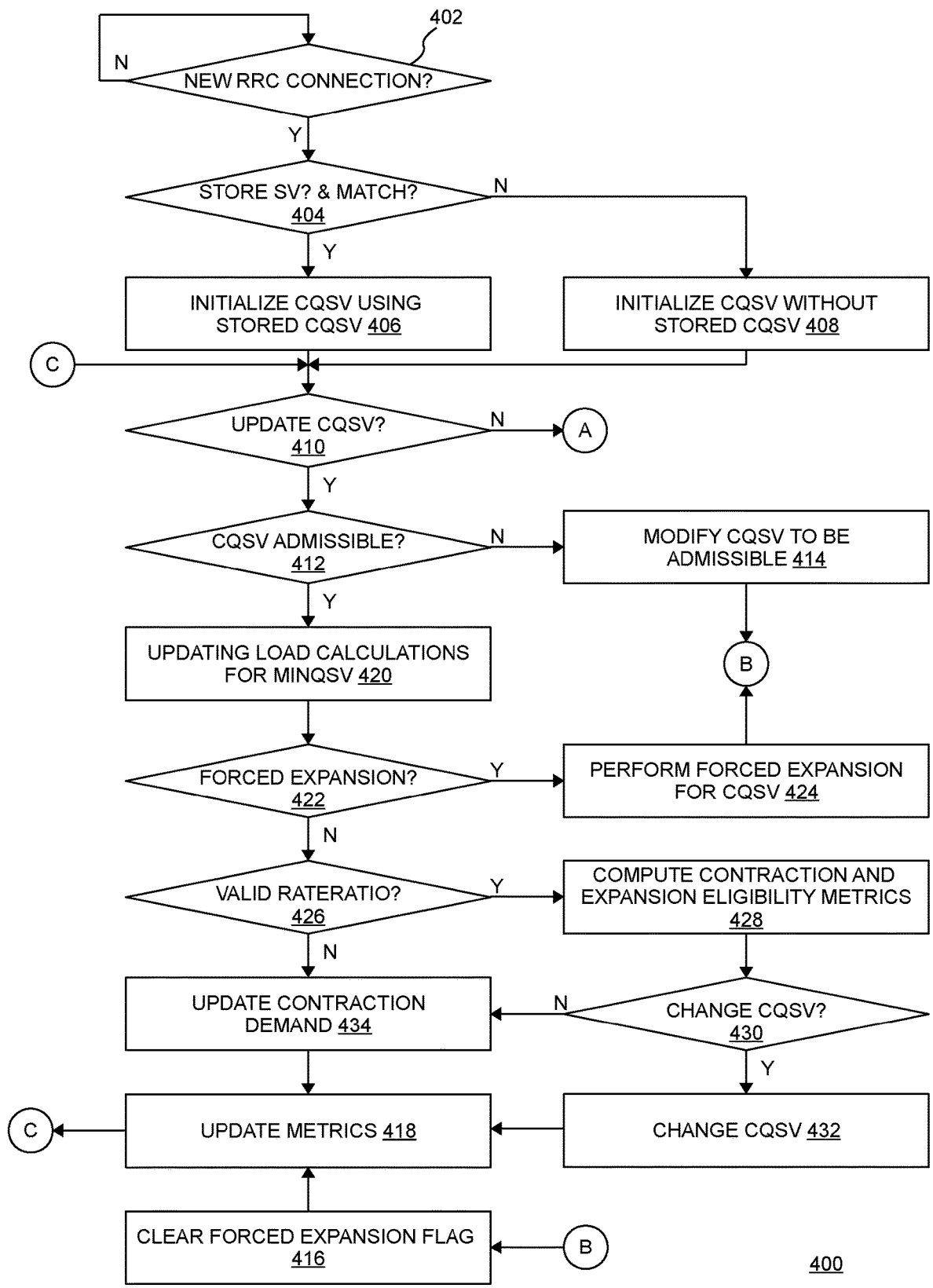
Figure 4B:
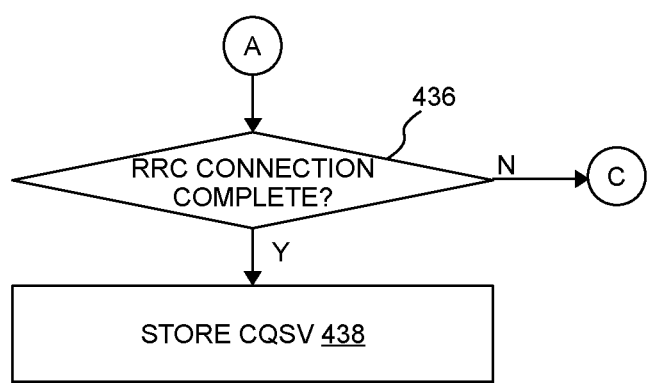

FIGS. 4A-4B comprise a flow chart illustrating one exemplary embodiment of a method of dynamically managing a simulcast zone for a UE in a C-RAN.

Figure 5A:
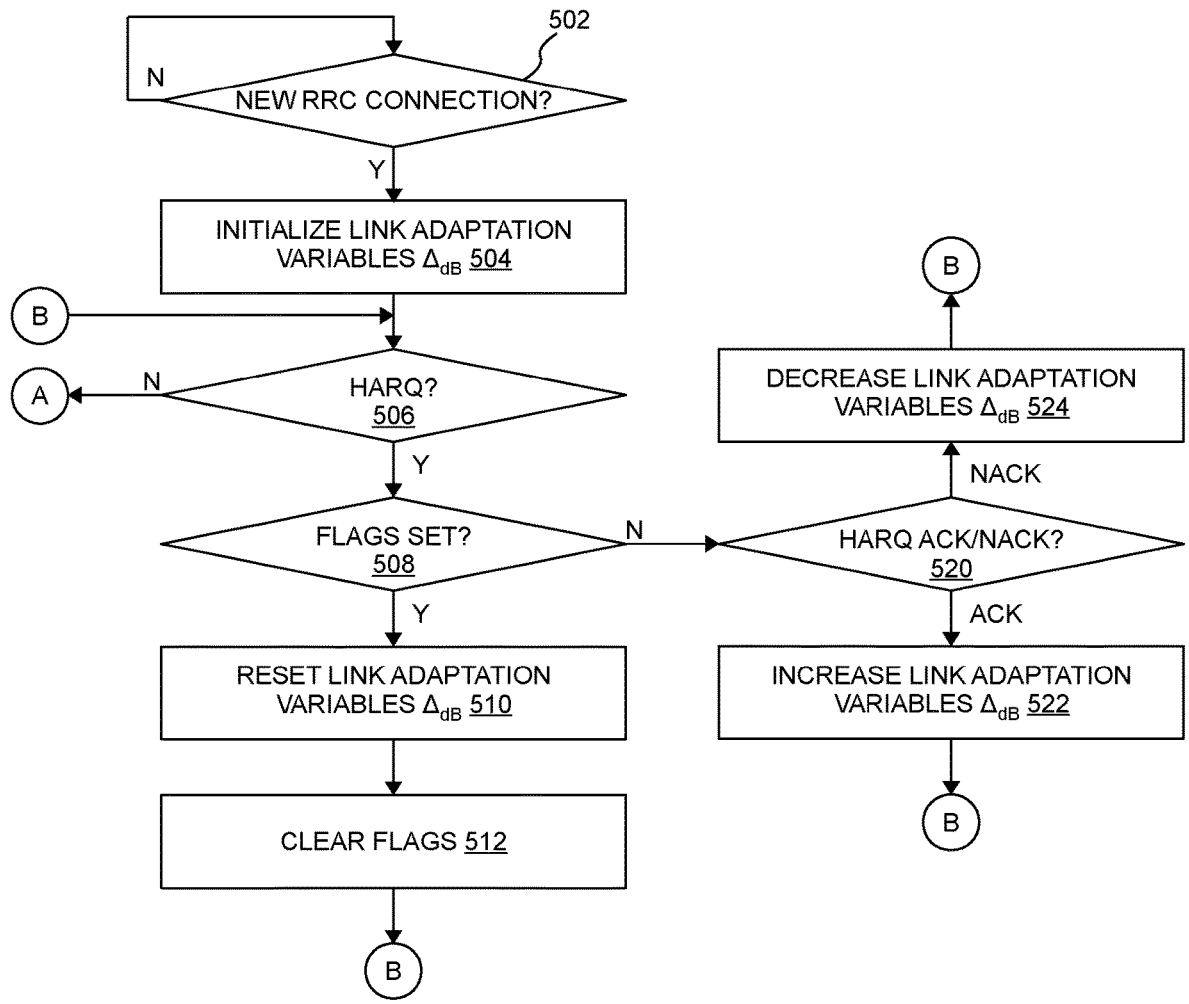
Figure 5B:
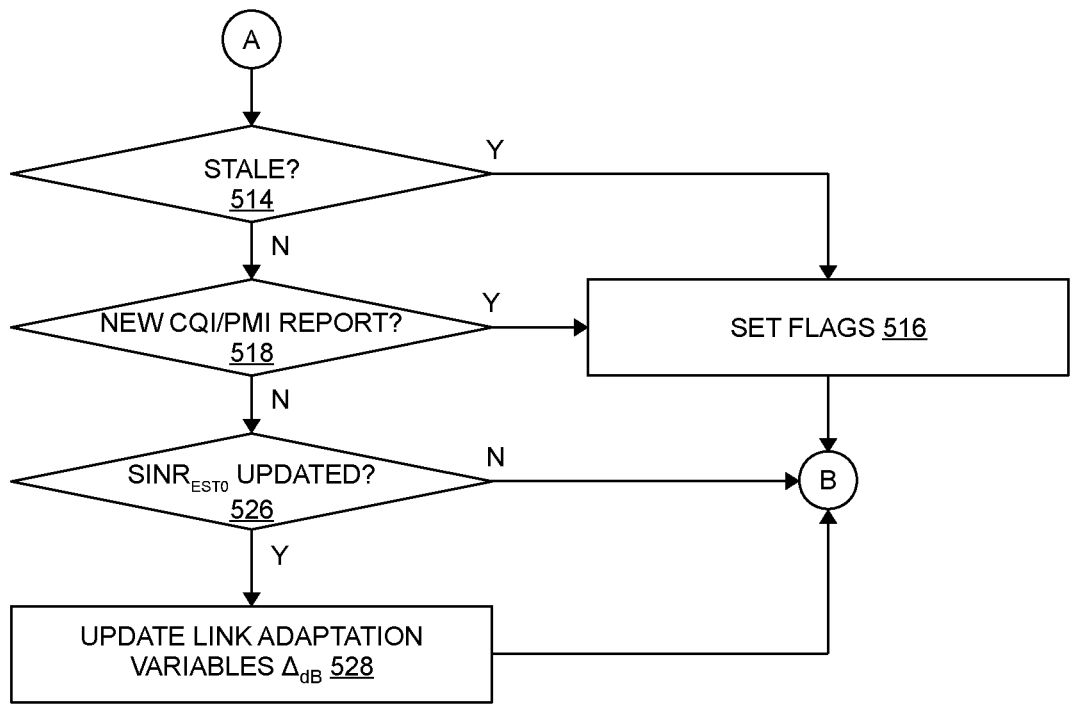

FIGS. 5A-5B comprise a flow chart illustrating one exemplary embodiment of a method of dynamically managing a link adaptation variable used to initialize and dynamically update the modulation and coding scheme (MCS) used to communicate with a UE in a C-RAN.

Like reference numbers and designations in the various drawings indicate like elements.

DETAILED DESCRIPTION

FIG. 1 is a block diagram illustrating one exemplary embodiment of a radio access network (RAN) system 100 in which the dynamic reuse techniques described here can be implemented. The system 100 is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN (point-to-multipoint distributed base station) architecture that employs at least one baseband unit 104 and multiple radio points (RPs) 106 serve at least one cell 103. The system 100 is also referred to here as a "C-RAN system" 100. The baseband units 104 are also referred to here as "baseband controllers" 104 or just "controllers" 104. Each RP 106 includes or is coupled to one or more antennas 108 via which downlink RF signals are radiated to user equipment (UE) 110 and via which uplink RF signals transmitted by UEs 110 are received.

More specifically, in the example shown in FIG. 1, each RP 106 comprises two antennas 108. Each RP 106 can include or be coupled to a different number of antennas 108.

The system 100 is coupled to the core network 112 of each wireless network operator over an appropriate back-haul. In the exemplary embodiment shown in FIG. 1, the Internet 114 is used for back-haul between the system 100 and each core network 112. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Moreover, in this exemplary embodiment, each controller 104 communicates with the MME and SGW in the EPC core network 112 using the LTE Si interface and communicates with other eNodeBs using the LTE X2 interface. For example, the controller 104 can communicate with an outdoor macro eNodeB (not shown) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary embodiment shown in FIG. 1, the front-haul that communicatively couples each controller 104 to the one or more RPs 106 is implemented using a standard ETHERNET network 116. However, it is to be understood that the front-haul between the controllers 104 and RPs 106 can be implemented in other ways.

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in (L1) FIG. 1, each baseband controller 104 comprises Layer-3 (L3) functionality 120, Layer-2 (L2) functionality 122, and Layer-1 (L1) functionality 124 configured to perform at least some of the Layer-3 processing, Layer-2 processing, and Layer-1 processing, respectively, for the LTE air interface implemented by the RAN system 100, and each RP 106 includes (optionally) Layer-1 functionality (not shown) that implements any Layer-1 processing for the air interface that is not performed in the controller 104 and one or more radio frequency (RF) circuits (not shown) that implement the RF front-end functions for the air interface and the one or more antennas 108 associated with that RP 106.

Each baseband controller 104 can be configured to perform all of the digital Layer-3, Layer-2, and Layer-1 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 116 is able to deliver the required high data rate.

If the front-haul ETHERNET network 116 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain, in the downlink, before the Inverse Fast Fourier Transform (IFFT) is performed and, in the uplink, after the Fast Fourier Transform (FFT). The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

Where frequency-domain IQ data is front-hauled between the controllers 104 and the RPs 106, each baseband controller 104 can be configured to perform all or some of the digital Layer-3, Layer-2, and Layer-1 processing for the air interface. In this case, the Layer-1 functions in each RP 106 can be configured to implement the digital Layer-1 processing for the air interface that is not performed in the controller 104.

Where the front-haul ETHERNET network 116 is not able to deliver the data rate need to front haul (uncompressed) time-domain IQ data, the time-domain IQ data can be compressed prior to being communicated over the ETHERNET network 116, thereby reducing the data rate needed communicate such IQ data over the ETHERNET network 116.

Data can be front-hauled between the controllers 104 and RPs 106 in other ways (for example, using front-haul interfaces and techniques specified in the Common Public Radio Interface (CPRI) and/or Open Base Station Architecture Initiative (OBSAI) family of specifications).

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

In the exemplary embodiment shown in FIG. 1, a management system 118 is communicatively coupled to the controllers 104 and RPs 106, for example, via the Internet 114 and ETHERNET network 116 (in the case of the RPs 106).

In the exemplary embodiment shown in FIG. 1, the management system 118 communicates with the various elements of the system 100 using the Internet 114 and the ETHERNET network 116. Also, in some implementations, the management system 118 sends and receives management communications to and from the controllers 104, each of which in turn forwards relevant management communications to and from the RPs 106.

As noted above, "reuse" refers to situations where separate downlink data intended for two (or more) different UEs 110 is simultaneously transmitted to the UEs 110 using the same resource elements. Typically, these situations will arise when the UEs 110 are sufficiently physically separated from each other so that the different downlink transmissions do not interfere with each other when transmitted from differing subsets of RPs 106. Also, as noted above, this type of reuse is also referred to as "spatial reuse."

For each UE 110 that is attached to the cell 103, the controller 104 assigns a subset of the RPs 106 to that UE 110, where the RPs 106 in the subset are used to transmit to that UE 100. This subset of RPs 106 is referred to here as the "simulcast zone" for that UE 110.

In the exemplary embodiment described here in connection with FIG. 1, the simulcast zone for each UE 110 is determined by the serving controller 104 using a "signature vector" (SV) associated with that UE 110. In this embodiment, a signature vector is determined for each UE 110. The signature vector is determined based on receive power measurements made at each of the RPs 106 serving the cell 103 for uplink transmissions from the UE 110.

When a UE 110 makes initial LTE Physical Random Access Channel (PRACH) transmissions to access the cell 103, each RP 106 will receive those initial PRACH transmissions and a signal reception metric indicative of the power level of the PRACH transmissions received by that RP 106 is measured (or otherwise determined). One example of such a signal reception metric is a signal-to-noise plus interference ratio (SNIR). The signal reception metrics that are determined based on the PRACH transmissions are also referred to here as "PRACH metrics."

Each signature vector is determined and updated over the course of that UE's connection to the cell 103 based on Sounding Reference Signals (SRS) transmitted by the UE 110. A signal reception metric indicative of the power level of the SRS transmissions received by the RPs 106 (for example, a SNIR) is measured (or otherwise determined). The signal reception metrics that are determined based on the SRS transmissions are also referred to here as "SRS metrics."

Each signature vector is a set of floating point signal-to-interference-plus-noise ratio (SINR) values (or other metric), with each value or element corresponding to a RP 106 used to serve the cell 103.

The signature vector can be used to determine the RP 106 having the best signal reception metric by scanning or sorting the elements of the signature vector to find the element having the best signal reception metric. The RP 106 that corresponds to that "best" element is also referred to here as the "primary RP 106" for the UE 110.

A "quantized signature vector" (QSV) is also determined for each UE 110. The QSV for each UE 100 is a vector that includes an element for each RP 106, where each element has one of a finite set of values. For example, the element for each RP 106 has a first value (for example, a value of "1") if the corresponding RP 106 is included in the simulcast zone for that UE 110 and has second value (for example, a value of "0") if the corresponding RP 106 is not included in the simulcast zone for that UE 110. The QSV for each UE 110 can be determined using the SV for that UE 110.

The QSVs for the UEs 110 can be used to conveniently determine if the simulcast zones of two UEs 110 do not include any of the same RPs 106. That is, the QSVs for two UEs 110 can be used to conveniently determine if the simulcast zones for the two UEs 110 are disjoint. If this is the case, the simulcast zones for the UEs 110 (and the UEs 110 themselves) are referred to here as being "orthogonal" to each other. This can be done, for example, applying a logical "AND" operation on corresponding elements of the two QSVs.

If the simulcast zones for two UEs 110 are orthogonal to each other, then those UEs 110 are candidates for spatial reuse since different downlink transmissions can be simultaneously transmitted from the disjoint sets of RPs 106 to the UEs 110. In general, fewer RPs 106 in the simulcast zone of a UE 110 likely results in more opportunities for that UE 110 to be put into reuse with another UE 110 connected to the same cell 103 and higher overall system throughput with the trade-off that each UE 110 might experience more interference or lower throughput. Conversely, more RPs 106 in the simulcast zone of a UE 110 likely results in fewer opportunities for that UE 110 to be put into reuse with another UE 110 connected to the same cell 103 and lower overall system throughput with the trade-off that the UE 110 might experience less interference or higher airlink throughput.

As used here, "expanding" a QSV or a simulcast zone refers to increasing the number of RPs 106 in the simulcast zone, and "contracting" a QSV or simulcast zone refers to reducing the number of RPs 106 in the simulcast zone.

In the exemplary embodiment described here in connection with FIG. 1, the serving controller 104 is configured to manage the signature vectors QSVs for the UEs 110 connected to the cell 103.

FIG. 2 comprises a flow chart illustrating one exemplary embodiment of a method 200 of dynamically maintaining a signature vector in a C-RAN. The embodiment of method 200 shown in FIG. 2 is described here as being implemented in the C-RAN system 100 of FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner).

Method 200 is described here as being performed for each UE 110 when it attaches to the cell 103 and establishes an RRC connection. The particular UE 110 for which method 200 is being performed is referred to here as the "current" UE 110.

When the current UE 110 establishes a new RRC connection with the cell 103 (block 202), a signal reception metric (such as the SINR) is determined from the associated PRACH transmissions at each RP 106 (block 204).

If the serving controller 104 has a stored SV for the current UE 110 (checked in block 206), the serving controller 104 checks if there is a sufficient match between the stored SV and the determined PRACH metrics (block 208). If there is, the current SV is initialized using the stored SV (block 210).

For example, the current UE's SAE-Temporary Mobile Subscriber Identity (S-TMSI) can be used to check if there is a stored SV for the current UE 110 and retrieve that stored SV if there is one.

In one implementation, the stored SV for the current UE 110 is sorted in descending order, where $SV_j$ denotes the jth element of the current UE's stored SV and $RP_j$ denotes the RP 106 corresponding to the jth element of the current UE's stored SV. In this implementation, the serving controller 104 determines that there is a sufficient match between the stored SV and the PRACH metrics if all of the following are true:

The elapsed time since the last update of the stored SV during the current UE's previous RRC connection is less than a configurable setting (referred to here as "StoredSvMaxAge");

The PRACH transmission is detected by the primary RP 106 of the stored SV (for example, the PRACH signal reception metric for the primary RP 106 is above a predetermined threshold);

The PRACH transmission is detected by the RP 106 having the next best reception metric in the stored SV (the "second" RP 106), if the difference between the reception metric for the primary RP 106 and the reception metric for the second RP 106 is less than a configurable value (referred to here as "deltaSvForPrachMatch"); and When at least two RPs 106 detect the PRACH transmission, the two RPs 106 with the highest PRACH reception metric must be among the RPs 106 having the top three reception metrics in the stored SV.

If these conditions are all true, it is determined that there is a sufficient match between the stored SV and the PRACH metrics and the current SV is initialized using the stored SV.

When the first SRS transmission from the current UE 110 is received (checked in block 212), if the current SV has not been initialized with a stored SV for the current UE 110 (checked in block 214), the current SV is initialized using the SRS reception metrics determined for the initial SRS transmission at each RP 106 (block 216). If the current SV has been initialized with a stored SV for the current UE 110, the current SV is re-initialized by combining the stored SV with the SRS reception metrics determined for the initial SRS transmission at each RP 106 (block 218). In this exemplary embodiment, the stored SV is combined with the SRS reception metrics using a relative weighting that depends on the elapsed time since the last update in the current UE's previous RRC connection. In one implementation, the combining using a relative weighting is done as follows:

New SV=Stored SV*(1−min($\Delta t$/(StoredSvMaxAge+ $\Delta T_{init}$),1))+SRS SV*$\Delta t$/(StoredSvMaxAge+ $\Delta T_{init}$)

where $\Delta t$ is the elapsed time since the last update of the stored SV for the current UE 110 during the current UE's previous RRC connection and $\Delta T_{init}$ is the typical time elapsed between the PRACH transmission for a UE 110 and the first SRS transmission for the UE 110 (which is nominally set to 240 milliseconds).

Each time a subsequent SRS transmission is received from the current UE 110 (checked in block 220), the SV for the current UE 110 is updated (block 222). In one implementation, each element of the current SV is updated by calculating a moving average that is a function of the SRS reception metrics for the corresponding RP 106.

In this exemplary embodiment, every time an RRC re-connection occurs for the current UE 110, the current SV for the current UE 110 is retained and used without re-initialization.

When the current RRC connection is complete (checked in block 224), the current SV for the current UE 110 is stored for possible later retrieval and use as described above (block 226).

In one implementation, each time a subsequent SRS transmission from the current UE 110 is received and the current SV for the current UE 110 is updated by calculating a moving average that is a function of the SRS reception metrics at each RP 106, a noise-floor-compensated version of the SV is generated for the current UE 110 from the original, uncompensated version of the SV for the current UE 110.

The noise-floor-compensated SV for the current UE 110 can be created as follows. In the following discussion, the original, uncompensated SV is denoted avgSV=[s(1), ..., s(Nrp)], where the elements of avgSV are sorted in descending (from best to worst average signal reception metric), $N_{rp}$ is the number of RPs 106, and s(1) is the element corresponding to the primary RP 106 for the current UE 110.

The corresponding noise-floor-compensated average SV is determined by:

$$avgSV\_tilde=[s\_tilde(1), \ldots, s\_tilde(N_{rp})],$$

where:
s_tilde(m)=Min(s(m), s(1)−(m−1)×d), where m>=k_hat
d=Max((s(1)−s(k_hat−1))/(k_hat−2),(s(1)−s(k_hat))/(k_hat−1))

k_hat is the index of the first RP 106 having a corresponding element in the sorted avgSV that is significantly influenced by the noise floor. That is, k_hat is the index of the first RP 106 having a corresponding element in the sorted avgSV for which both of the following are true:

variance([s(k_hat) ... s($N_{rp}$)])<=VarianceThreshold
variance([s(k_hat−1) ... s($N_{rp}$)])>VarianceThreshold In one implementation, the value of VarianceThreshold is set to 1.0

FIG. 3 comprises a flow chart illustrating one exemplary embodiment of a method 300 of determining a minimum simulcast zone and a maximum simulcast zone for a UE in a C-RAN. The embodiment of method 300 shown in FIG. 3 is described here as being implemented in the C-RAN system 100 of FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner).

Method 300 is described here as being performed for each UE 110 that is connected to the cell 104 when the SV for the UE 110 is updated. The particular UE 110 for which method 300 is being performed is referred to here as the "current" UE 110.

As used here, a "minimum QSV" or "MinQSV" for a given UE 110 is the minimum number of RPs 106 that should be in that UE's simulcast zone. Also, a "maximum QSV" or "MaxQSV" for a given UE 110 is the maximum number of RPs 106 that should be in that UE's simulcast zone.

In this embodiment, the elements of the SV are sorted in descending order from the element having the best metric to the element having the worst metric. Then, a simulcast zone including a given number N of RPs 106 can be determined from the sorted SV by including in the simulcast zone the RPs 106 that correspond to the first N entries of the sorted SV. Therefore, the simulcast zone that includes the number of RPs 106 specified by the MinQSV includes the first N entries of the sorted SV, where N equals the number specified by the MinQSV. This simulcast zone is also referred to here simply as the "MinQSV simulcast zone" or just the "MinQSV." Likewise, the simulcast zone that includes the number of RPs 106 specified by the MaxQSV includes the first N entries of the sorted SV, where N equals the number specified by the MaxQSV. This simulcast zone is also referred to here simply as the "MaxQSV simulcast zone" or just the "MaxQSV."

When the current UE 110 establishes a new RRC connection to the cell 103 (block 302), the maximum QSV and minimum QSV for the current UE 110 are set to the full simulcast zone (block 304). That is, the maximum QSV and minimum QSV are both set to include the full number of RPs 106 that are used to serve the cell 103.

When the SV for the current UE 110 is initialized or updated in response to the receipt of an SRS transmission from the current UE 110 (block 306), the maximum QSV and minimum QSV for the current UE 110 are determined (block 308).

In this embodiment, the maximum QSV and minimum QSV are determined using a metric, $SIR_{PL}$. For a given candidate simulcast zone, the $SIR_{PL}$ for that simulcast zone is defined as the ratio S/I, where S is the sum of the elements of the sorted current SV that correspond to the RPs 106 in the associated candidate simulcast zone and I is the sum of the remaining elements of the sorted current SV.

More specifically, $SIR_{PLj}$ represents the $SIR_{PL}$ for a candidate QSV with a simulcast zone size of j, where 1<=j<=J and J is the total number of RPs 106 used to the serve the cell 103. Each candidate QSV has an associated candidate simulcast zone, which includes the j RPs 106 that have the best signal reception metrics in the current SV.

For example, $SIR_{PL1}$ represents the $SIR_{PL}$ for a simulcast zone that only includes the primary RP 106 for the current UE 110. $SIR_{PLJ}$ represents the $SIR_{PL}$ for the full simulcast zone that includes all of the RPs 106 that are used to serve the cell 103.

Each $SIR_{PLj}$ is determined based on the current SV for the UE 110. Each time the SV for the UE 110 is initialized or updated in response to receiving a SRS transmission, the various values of $SIR_{PLj}$ are determined using the updated SV.

Then, the minimum QSV, MinQSV, is computed as the QSV with the smallest index j for which $SIR_{PLj}$>Min_SIR, and the maximum QSV, MaxQSV, is computed as the QSV with the smallest index j for which $SIR_{PLj}$>Max_SIR. If the smallest index j that satisfies the respective inequalities for MinQSV and MaxQSV is greater than a configurable maximum allowed simulcast zone size, SZ_max_allowed, then the MinQSV and/or the MaxQSV are reduced to the maximum allowed simulcast zone size. Also, if the smallest index j that satisfies the respective inequalities for MinQSV and MaxQSV is less than a configurable minimum allowed simulcast zone size, SZ_min_allowed, then the MinQSV and/or the MaxQSV are increased to the minimum allowed simulcast zone size.

Min_SIR and Max_SIR are configurable parameters that must satisfy the condition Max_SIR>=Min_SIR. If MaxSIR=MinSIR=the total number of RPs 106 used to serve the cell 103, then reuse is effectively disabled since the full simulcast zone must be used.

In the exemplary embodiment shown in FIG. 3, if the SV for the current UE 110 was not initialized based on a Stored SV (checked in block 310), then the minimum QSV for the current UE 110 determined above in connection with block 308 is expanded (block 314) until a predetermined number of SRS transmissions have been used to update the SV for the UE 110 (checked in block 312). By doing this, a more conservative minimum QSV (that is, a larger minimum QSV) is used for the current UE 110 while the SV is based on only a relatively small number of SRS transmissions.

In one implementation, the minimum QSV is expanded by a progressively decreasing amount until the predetermined number of SRS transmissions have been used to update the SV. For example, a phased-approach based on two configurable parameters, can be used. These two configurable parameters include a first parameter, $R_{QSV}$, which is a configurable parameter used to determine by how much the minimum QSV is to be expanded in each phase, and the second parameter, $N_{SRS}$, is a configurable parameter used to determine the duration of each phase.

In this example, until the SV for the current UE 110 has been updated based on a number of received SRS transmissions that equals $N_{SRS}$, each time the minimum QSV is updated in connection with block 308, the resulting minimum QSV is expanded by a number RPs 106 equal to $R_{QSV}$. Thereafter, until the SV for the current UE 110 has been updated based on an additional number of received SRS transmission equal to $N_{SRS}$, each time the minimum QSV is updated in connection with block 308, the resulting minimum QSV is expanded by a number of RPs 106 equal to the maximum of $R_{QSV}$-2 or 0 (that is, Max($R_{QSV}$-2,0)). Thereafter, until the SV for the current UE 110 has been updated based on an additional number of received SRS transmission equal to $N_{SRS}$, each time the minimum QSV is updated in connection with block 308, the resulting minimum QSV is expanded by a number of RPs 106 equal to the maximum of $R_{QSV}$-4 or 0 (that is, Max($R_{QSV}$-4,0)). After this point, the resulting minimum QSV is no longer expanded.

The processing associated with blocks 306-314 is repeated until the RRC connection is complete.

In the exemplary embodiment described here in connection with FIG. 1, link adaption is used to initialize and dynamically update the modulation and coding scheme (MCS) and the current QSV (cQSV) for each UE 110 that is connected to the cell 103.

FIGS. 4A-4B comprise a flow chart illustrating one exemplary embodiment of a method 400 of dynamically managing a simulcast zone for a UE in a C-RAN. The embodiment of method 400 shown in FIGS. 4A-4B is described here as being implemented in the C-RAN system 100 of FIG. 1, though it is to be understood that other embodiments can be implemented in other ways.

The blocks of the flow diagram shown in FIGS. 4A-4B have been arranged in a generally sequential manner for ease of explanation; however, it is to be understood that this arrangement is merely exemplary, and it should be recognized that the processing associated with method 400 (and the blocks shown in FIGS. 4A-4B) can occur in a different order (for example, where at least some of the processing associated with the blocks is performed in parallel and/or in an event-driven manner).

Method 400 is described here as being performed for each UE 110 that is connected to the cell 103. The particular UE 110 for which method 400 is being performed is referred to here as the "current" UE 110.

As described below, at the end of each RRC connection by a given UE 110 with the cell 103, the most recent cQSV is stored for possible use with the UE's next RRC connection.

When the current UE 110 establishes a new RRC connection to the cell 103 (block 402 shown in FIG. 4A) and the serving controller 104 has determined that there is a stored SV for the current UE 110 and there is a sufficient match between the stored SV and the PRACH metric determined for the new RRC connection (block 404), the cQSV for the current UE 110 is initialized using the stored cQSV for the current UE 110 (block 406). Otherwise, the cQSV is initialized without using a stored cQSV for the current UE 110 (block 408).

In this exemplary embodiment, when the SV is initialized with a stored SV (and therefore there is a corresponding stored cQSV), the cQSV is initialized as follows. A first candidate QSV (QSV1), which has a corresponding candidate simulcast zone, is found that satisfies the following conditions.

First, minQSV⇐QSV1⇐Stored cQSV, where, in this case, "QSV1" represents the number of RPs 106 in the simulcast zone associated with QSV1 and "Stored cQSV" represents the number of RPs 106 in the simulcast zone associated with the Stored cQSV.

Second, no $RP_j$ in the candidate simulcast zone associated with QSV1 has a $L_{sum}(j)$>Init_Load-Thr, where $L_{sum}(j)$ is the cumulative load (based on a sliding window) associated with the processing at $RP_j$ of all Resource Block Units (RBUs) allocated to all UEs 110 that have that $RP_j$ in their simulcast zone, and Init_Load-Thr is a configurable load threshold.

If both those conditions are satisfied, then the first candidate QSV1 is used as the cQSV for the current UE 110 unless SIR(QSV1)<SIR(stored cQSV)–configSIRLoss1. If that latter condition is satisfied, a second candidate QSV2 is found that satisfies the following conditions: QSV2>QSV1 such that SIR(QSV2)>=SIR(stored cQSV)–configSIRLoss1, where "QSV1" represents the number of RPs 106 in the simulcast zone associated with QSV1, "QSV2" represents the number of RPs 106 in the simulcast zone associated with QSV2, and configSIRLoss1 is a configurable threshold parameter. If a second candidate QSV2 is found that satisfies this condition, the second candidate QSV2 is used as the cQSV for the current UE 110.

In this exemplary embodiment, when the SV is not initialized with a stored SV (and, therefore, the cQSV for the current UE 110 is not initialized with a stored cQSV for the current UE 110), the cQSV is initialized as follows. A first candidate QSV (QSV1), which has a corresponding a candidate simulcast zone, is found that satisfies the following conditions.

First, minQSV⇐QSV1⇐maxQSV, where, in this case, "QSV1" represents the number of RPs 106 in the simulcast zone associated with QSV1.

Second, no RPj in the simulcast zone associated with QSV1 has a $L_{sum}(j)$>Init_Load-Thr.

If both those conditions are satisfied, then the first candidate QSV1 is used as the cQSV for the current UE 110 unless SIR(QSV1)<SIR(maxQSV)–configSIRLoss2. If that latter condition is satisfied, a second candidate QSV2 is found that satisfies the following conditions: QSV2>QSV1 such that SIR(QSV2)>=SIR(stored cQSV)–configSIRLoss2, where configSIRLoss2 is a configurable threshold parameter and configSIRLoss2>configSIRLoss1. If a second candidate QSV2 is found that satisfies this condition, the second candidate QSV2 is used as the cQSV for the current UE 110.

Method 400 further comprises, after initialization of the cQSV, determining when to update the cQSV for the current UE 110 (block 410). In this exemplary embodiment, the cQSV for the current UE 110 is updated periodically using a period $P_{cqsv}$ that is determined as the following ratio: Rank Report Period/NumQSVOppPerRankRep, where Rank Report Period is the period used by UEs 110 in reporting their Rank Indication (RI) to the serving controller 104 (in milliseconds) and NumQSVOppPerRankRep is a configurable parameter indicating the number of opportunities to update the cQSV for each Rank Report Period (for example, this can be set to an integer of 1, 2, or 4). In one example, default values of 160 milliseconds and 2, respectively, can be used for Rank Report Period and NumQSVOppPerRankRep, and the minimum allowed value for the period $P_{cqsv}$ is 40 milliseconds.

In this exemplary embodiment, the UE's first cQSV update opportunity for a given RRC connection occurs as early as possible subject to the following conditions: The first condition is that the first cQSV update opportunity will not occur before the SV and cQSV are initialized. More specifically, when SV and cQSV have not yet been not initialized upon S-TMSI retrieval, the first cQSV update opportunity will not occur until after the first SRS transmission from the current UE 110 has been received. The second condition is that, after the current UE's cQSV has been initialized, the current UE's first CQI report following a rank report will always coincide with a cQSV update opportunity, such that there is never a rank change between two cQSV update opportunities.

Method 400 further comprises, when it is determined that the current UE's cQSV should be updated, checking whether the cQSV for the current UE 110 is currently admissible (block 412) and, if the cQSV for the current UE 110 is determined to be inadmissible, modifying the cQSV for the current UE 110 to be admissible (block 414). If the cQSV is modified at this point, the forced expansion flag for the current UE 110 (described below) is cleared (block 416), the related metrics are updated (block 418), and the processing for the current cQSV update opportunity is complete.

As noted above, there are J candidate QSVs, where the j-th candidate QSV, $QSV_j$, is the one having a simulcast zone containing the j RPs 106 with the best signal reception metric as reflected in the most-recent SV for the current UE 110. As used here, "jmin" and "jmax" represent values for the index j of the candidate cQSV associated with the current UE's minQSV and maxQSV, respectively. The candidate QSV based on the most-recent SV having an index jmin has a simulcast zone containing a number of RPs 106 equal to the minQSV for the current UE 110. This candidate QSV is also referred to here simply as the "minQSV" in the context of discussing particular candidate QSVs. The candidate QSV based on the most-recent SV having an index jmax has a simulcast zone containing a number of RPs 106 equal to the maxQSV for the current UE 110. This candidate QSV is also referred to here simply as the "maxQSV" in the context of discussing particular candidate QSVs.

The set of admissible candidate QSVs for the current UE 110 comprises the candidate QSVs {jmin, . . . , jmax}. A cQSV is deemed admissible if, based on the most-recent SV for the current UE 110, it is included in this set of admissible candidate QSVs for the current UE 110 and is deemed inadmissible if this is not the case. In this embodiment, the current UE's cQSV remains admissible (and is not changed at this point) even if the ordering of the RPs 106 in the most-recent SV has changed since the last cQSV-update opportunity, as long as the cQSV is still included in the set of admissible candidate QSVs based on the most-recent SV.

Since the SRS transmissions will not be aligned with cQSV update opportunities, it is possible for a change in the SV for the current UE 110 to cause the current UE's cQSV to become temporarily inadmissible in between two cQSV update opportunities, and in this case, the inadmissibility will not be detected or corrected until a subsequent cQSV update opportunity.

When a cQSV for the current UE 110 is deemed inadmissible at a cQSV update opportunity, the inadmissibility is corrected immediately by setting the cQSV equal to the candidate QSV included in the set of admissible candidate QSVs determined based on the most-recent SV that has the smallest index j, such that: $SIR_{PL,j} \geq SIR_{PL}$, where $SIR_{PL}$ was the SIR of the current cQSV when it was last deemed admissible and $SIR_{PL,j}$ is the SIR of the candidate QSV having index j. When no candidate QSV included in the set of admissible candidate QSVs satisfies the above inequality, the cQSV for the current UE 110 is set to the maxQSV for the current UE 110.

Method 400 further comprises, if the cQSV for the current UE 110 is determined to be admissible, updating load calculations for any changes in minQSV for the current UE 110 (block 420). As noted above in connection with FIG. 3, the minQSV is updated and changed from time to time. At each cQSV update opportunity for the current UE 110, whether the current UE's minQSV has changed since the last cQSV update opportunity for the current UE 110 is checked. If it has, the load calculations for those RPs 106 that are affected by the change in the minQSV are updated. Specifically, if the current UE's minQSV has changed by adding one or more new RPs 106 to the simulcast zone associated with the minQSV, the load calculation for each of those RPs 106 is increased by the additional load associated with the current UE 110, and if the current UE's minQSV has changed by removing one or more RPs 106 from the simulcast zone associated with the minQSV, the load calculation for each of those RPs 106 is decreased by the load associated with the current UE 110.

Method 400 further comprises checking if the cQSV for the current UE 110 should be forced to expand (block 422). If that is the case, a forced expansion of the cQSV for the current UE 110 is performed (block 424). In this exemplary embodiment, there is a flag (also referred to here as the "force expansion flag") maintained for each connected UE 110 that indicates whether a forced expansion of the cQSV should be performed for that UE 110 during the next update opportunity. Also, in this embodiment, there is a variable maintained for each connected UE 110 that indicates when the last forced expansion was performed for that UE 110. A configurable parameter indicates by how many RPs 106 the minQSV is expanded when a forced expansion is performed.

If a forced expansion of the cQSV for the current UE 110 is performed, the forced expansion flag for the current UE 110 is cleared (block 416), the related metrics are updated (block 418), and the processing for the current cQSV update opportunity is complete.

In some situations, the SINR actually experienced in the channel for the current UE 110 may be much lower than the estimated SINR, due to, for example, inaccuracies in SRS measurements and, as a result, the resulting SV. The UE's cQSV simulcast zone in such circumstances may not contain all the RPs 106 it should to provide a sufficiently high SIR. In such a situation, the current UE 110 may experience a high block error ratio (BLER) or be provided throughput much lower than desired. To address such issues, the cQSV for the current UE 110 can be flagged for a forced expansion.

In one implementation, such a situation can be identified (and the current UE 110 flagged for a forced expansion) if one of the following occurs: the current UE 110 receives two consecutive negative acknowledgments (NACKs) for third retransmissions, the current UE 110 receives two consecutive NACKs for first transmissions made using a power level below a configurable floor, or the current UE 110 receives two consecutive NACKs for first transmissions made using a MCS of 0.

In one implementation, the cQSV for the current UE 110 may not be contracted after a forced expansion for a configurable hysteresis period of time after the forced expansion is performed. In such an implementation, the processing associated with determining if the cQSV for the current UE 110 should be contracted is skipped until the configurable hysteresis period has elapsed after the forced expansion.

Method 400 further comprises, if the cQSV for the current UE 110 should not be forced to expand, determining if the current UE 110 has a valid RateRatio (checked in block 426). If that is the case, a contraction eligibility metric and an expansion eligibility metric for the cQSV of the current UE 110 are computed (block 428) and the eligibility of the current UE 110 for contraction and expansion of its cQSV is tested (block 430). Then, if indicated by the testing, the cQSV for the current UE 110 is changed as indicated (block 432) and the related metrics are updated (block 418) and the processing for the current cQSV update opportunity is complete. Otherwise, method 400 proceeds to block 434 (which is described below).

As noted above, an estimate of the ratio between a connected UE's actual achieved rate and its average virtual CQI rate (adjusted to include link adaptation noise) is calculated for the current UE 110. A UE's actual achieved rate reflects the effect of reuse interference, whereas the average virtual CQI rate represents the achievable rate without reuse interference. Thus, a higher ratio indicates a lower amount of reuse interference, whereas a lower ratio indicates a higher amount of reuse interference. This estimated ratio is also referred to here as the "RateRatio."

In this exemplary embodiment, for each $RP_j$, one UE 110 that has that $RP_j$ in its cQSV is identified as the UE 110 most eligible for contraction for that $RP_j$. To track this, a contraction eligibility metric threshold and UE identifier are maintained for each $RP_j$ of the cell 103, where the UE identifier is an identifier associated with the UE 110 that is most eligible for contraction (for example, the RNTI of that UE 110) and the contraction eligibility metric threshold is the most recent value of the contraction eligibility metric for that most-eligible UE 110.

In one implementation, the contraction eligibility metric for the current UE 110 is computed by estimating the change in total airlink throughput after the contraction of the cQSV of the current UE 110 by removing various numbers of the outermost RPs 106 from the current UE's cQSV. Then, the maximum estimated change in the throughput and processing load, as well as the maximum contraction demand (described in below), are found for the various RPs 106 that are candidates for contraction. The contraction eligibility metric for the current UE 110 is determined based on the maximum estimated change in total airlink throughput, the maximum estimated change in the processing load, the maximum contraction demand, and the RateRatio for the current UE 110.

It is noted, however, that in this implementation, any resulting contraction of the cQSV for the current UE 110 is limited to only to the outermost RP 106 in the cQSV. As used here, a number of "outermost" RPs 106 of a cQSV refers to that number of RPs 106 in the cQSV that have the lowest signal reception metrics in the most-recent SV. Also, this computation is subject to the minQSV. That is, the current UE's cQSV is not eligible to be contracted below its minQSV.

In such an implementation, the eligibility of the current UE 110 for contraction of its cQSV is tested by first checking the outermost RP 106 for the current UE's cQSV to see if the current UE 110 is the one most-eligible for contraction for that RP 106. This is determined by comparing the identifier of the current UE 110 to the identifier of the most eligible UE 110 for that outermost RP 106. If they do not match, then the computed contraction eligibility metric for the current UE 110 is compared with the contraction eligibility metric threshold for the outermost RP 106 in the current UE's cQSV. If the computed contraction eligibility metric for the current UE 110 is greater than the contraction eligibility metric threshold for the outermost RP 106 in the current UE's cQSV, the current UE 110 becomes the one that is most eligible for contraction for that outermost RP 106 and the contraction eligibility metric threshold for that outermost RP 106 is updated to be the computed contraction eligibility metric for the current UE 110. Otherwise, there is no change.

If there is a match between the identifier for the current UE 110 and the identifier of the UE 110 that is most-eligible for contraction for the outermost RP 106, then the computed contraction eligibility metric for the current UE 110 is compared to the contraction eligibility metric threshold for that outermost RP 106 to see if the computed contraction eligibility metric for the current UE 110 is greater than or equal to configurable percentage of the contraction eligibility metric threshold for that outermost RP 106 and if the computed contraction eligibility metric for the current UE 110 is greater than a configurable minimum margin value. If both of those conditions are true, then the current UE 110 is flagged for contraction and the contraction eligibility metric threshold and most-eligible UE 110 for contraction for the outermost RP 106 are both cleared. Otherwise, the contraction eligibility metric threshold for the outermost RP 106 is updated to be set to the computed contraction eligibility metric for the current UE 110.

Similar processing if performed for expansion.

In this exemplary embodiment, for each $RP_j$, one of the UE's 110 that has that $RP_j$ in its cQSV is identified as the UE 110 that is most eligible for expansion. To track this, an expansion eligibility metric threshold and UE identifier is maintained for each $RP_j$ of the cell 103, where the UE identifier is an identifier associated with the UE 110 that is most eligible for expansion (for example, the RNTI of that UE 110) and the expansion eligibility metric threshold is the most recent value of the expansion eligibility metric for that most-eligible UE 110.

In one implementation, the expansion eligibility metric for the current UE 110 is computed by estimating the change in total airlink throughput after the expansion of the cQSV of the current UE 110 by various numbers of the next potential RPs 106 that are not currently in the current UE's cQSV. Then, the maximum estimated change in the throughput and processing load, as well as the maximum contraction demand (described in below), are found for the various RPs 106 that are candidates for expansion. The expansion eligibility metric for the current UE 110 is determined based on the maximum estimated change in total airlink throughput, the maximum estimated change in the processing load, the maximum contraction demand, and the RateRatio for the current UE 110. This computation is subject to the maxQSV. That is, the current UE's cQSV is not eligible to be expanded above its maxQSV.

It is noted, however, that in this implementation, any resulting expansion of the cQSV is limited to only the next potential RP 106 that is not in the current UE's cQSV. As used here, a number of "next potential" RPs 106 for a cQSV refers to that number of RPs 106 that are not in the cQSV that have the highest signal reception metrics in the most-recent SV.

In such an implementation, the eligibility of the current UE 110 for expansion of its cQSV is tested by first checking the next potential RP 106 for the current UE's cQSV to see if the current UE 110 is the one that is the most-eligible for expansion for the next potential RP 106. This is determined by comparing the identifier of the current UE 110 to the identifier of the UE 110 that is most-eligible for expansion for the next potential RP 106. If they do not match, then the computed expansion eligibility metric for the current UE 110 is compared with the expansion eligibility metric threshold for the next potential RP 106 in the current UE's cQSV. If the computed expansion eligibility metric for the current UE 110 is greater than the expansion eligibility metric threshold for the next potential RP 106 in the current UE's cQSV, the current UE 110 is set to be the one most eligible for expansion for that RP 106 and the expansion eligibility metric threshold for that RP 106 is updated to be the computed expansion eligibility metric for the current UE 110. Otherwise, there is no change.

If there is a match between the identifier for the current UE 110 and the identifier of the UE 110 that is most-eligible for expansion for the next potential RP 106, then the computed expansion eligibility metric for the current UE 110 is compared to the expansion eligibility metric threshold for that next potential RP 106 to see if the computed expansion eligibility metric for the current UE 110 is greater than or equal to a configurable percentage of the expansion eligibility metric threshold for that RP 106 and if the computed expansion eligibility metric for the current UE 110 is greater than a configurable minimum margin value. If both of those conditions are true, then the current UE 110 is flagged for expansion and the expansion eligibility metric threshold and most-eligible UE 110 for expansion for the next potential RP 106 are both cleared. Otherwise, the expansion eligibility metric threshold for the next potential RP 106 is updated to be set to the computed expansion eligibility metric for the current UE 110.

Then, after the contraction and expansion eligibility metrics for the current UE 110 are computed, if the current UE's cQSV is flagged for contraction but not for expansion, the current UE's cQSV is contracted from its outermost RP 106.

If the current UE's cQSV is not flagged for contraction but is flagged for expansion, the current UE's cQSV is expanded into its next potential RP 106.

If the current UE's cQSV is flagged for both contraction and expansion, the computed contraction and expansion eligibility metrics are compared. If the contraction eligibility metric is greater than the expansion eligibility metric plus a configurable margin, the current UE's cQSV is contracted from its outermost RP 106. If the expansion eligibility metric is greater than the contraction eligibility metric plus a configurable margin, the current UE's cQSV is expanded into its next potential RP 106. Otherwise, the current UE's cQSV is not changed.

If the current UE's cQSV is not flagged for contraction or for expansion, the current UE's cQSV is not changed.

As noted above, in one implementation, the cQSV for the current UE 110 may not be contracted for a configurable hysteresis period of time after a forced expansion has occurred. In such an implementation, the processing described above for determining if the cQSV for the current UE 110 should be contracted is skipped until the configurable hysteresis period has elapsed after a forced expansion has occurred.

Method 400 further comprises updating the contraction demand for the RPs 106 in the current UE's minQSV (block 434). After this is done, the various metrics are updated (block 418) and the processing for the current cQSV update opportunity is complete.

As used here, the "expanded RPs" 106 for a given UE 110 are those RPs 106 that are in the UE's cQSV but not in the UE's minQSV, and the "minQSV RPs" 106 for a given UE 110 are those RPs 106 that are in the UE's minQSV. Also, as used here, a UE 110 has "expanded onto" a RP 106 if the UE 110 has expanded its cQSV beyond its minQSV to include that RP 106, which is not in the UE's minQSV.

A "contraction demand" refers to a metric indicative of the backlog for a UE 110 experienced at the UE's minQSV RPs 106. In this embodiment, the contraction demand is indicative of the maximum number of resource block units (RBUs) the UE 110 could utilize at the UE's minQSV RPs 106 if all other UEs 110 that have expanded onto those RPs 106 contracted their cQSVs to no longer include those RPs 106. The contraction demand is used to determine if other UEs 110 that have expanded onto those RPs 106 should contract their cQSVs in order to remove those RPs 106 from their cQSVs.

The following variables are maintained for each RP 106 serving the cell 103: a contraction demand variable, a UE identifier variable, a rate variable, and an expiry timer variable. The UE identifier variable is used to identify the UE 110 that includes that RP 106 in its minQSV that is experiencing the heaviest backlog. This identifier can be, for example, the RNTI of the UE 110. The contraction demand variable is used to store the contraction demand metric for the identified UE 110. The rate variable is used to store the estimated actual achieved rate for the identified UE 110. The expiry timer variable is used to indicate when the other variables should expire and no longer be used.

If the cQSV for the current UE 110 has not changed at the current update opportunity, then the backlog experienced by the current UE 110 at its minQSV RPs 106 is checked to see if it is greater that a configurable backlog threshold. If it is, the contraction demand metric for the current UE 110 is updated and then each of the current UE's minQSV RPs 106 is checked. For each of the current UE's minQSV RPs 106, if the UE identifier maintained for that RP 106 does not match the current UE's identifier, then if the contraction demand metric for the current UE 110 is greater than the one stored in the contraction demand variable of that RP 106, then the variables maintained for that RP 106 are updated with the current UE's identifier, contraction demand metric, and estimated actual achieved rate, and the expiry timer variable for that RP 106 is reset.

For each of the current UE's minQSV RPs 106, if the UE identifier maintained for that RP 106 does match the current UE's identifier, then the variables maintained for that RP 106 are updated with the current UE's contraction demand metric and estimated actual achieved rate, and the expiry timer variable for that RP 106 is reset.

As a result of such contraction demand processing, the contraction demand for the current UE 110 will be taken into account during the contraction and expansion calculations of other UEs 110 and will influence the contraction and expansion of the cQSVs of the other UEs 110.

When the current RRC connection is complete (checked in block 436 shown in FIG. 4B), the cQSV for the current UE 110 is stored for possible later retrieval and use as described above (block 438).

The various techniques described above can be used to more effectively manage the simulcast zone used for transmitting to each UE connected to a cell provided by a C-RAN.

FIGS. 5A-5B comprise a flow chart illustrating one exemplary embodiment of a method 500 of dynamically managing a link adaptation variable used to initialize and dynamically update the modulation and coding scheme (MCS) used to communicate with a UE in a C-RAN. The embodiment of method 500 shown in FIGS. 5A-5B is described here as being implemented in the C-RAN system 100 of FIG. 1, though it is to be understood that other embodiments can be implemented in other ways.

The blocks of the flow diagram shown in FIGS. 5A-5B have been arranged in a generally sequential manner for ease of explanation; however, it is to be understood that this arrangement is merely exemplary, and it should be recognized that the processing associated with method 500 (and the blocks shown in FIGS. 5A-5B) can occur in a different order (for example, where at least some of the processing associated with the blocks is performed in parallel and/or in an event-driven manner).

Method 500 is described here as being performed for each UE 110 that is connected to the cell 103. The particular UE 110 for which method 500 is being performed is referred to here as the "current" UE 110.

In this embodiment, the MCS for each UE 110 is determined using an estimate of the SINR ($SINR_{EST}$) for that UE 110. This $SINR_{EST}$ is determined by adjusting an initial estimate of the SINR for the UE 110 ($SINR_{EST0}$) by a link adaptation variable ($\Delta_{dB}$) maintained for each code word used for communicating with that UE 110. That is, $SINR_{EST}=SINR_{EST0}+\Delta_{dB}$.

When the current UE 110 establishes a new RRC connection to the cell 103 (block 502 shown in FIG. 5A), the link adaptation process is initialized and the link adaptation variable $\Delta_{dB}$ for each code word is initialized (for example, to 0) (block 504).

Then, the link adaptation variables $\Delta_{dB}$ are updated each time there is a HARQ transmission received for the current UE 110 (checked in block 506).

In this exemplary embodiment, for each UE 110, the controller 104 instantiates a flag (Stale UE flag) for each code word and associated link adaptation variable $\Delta_{dB}$. Each Stale UE flag is used to determine when the associated link adaptation variable $\Delta_{dB}$ is stale and should be reset.

When a HARQ transmission is received for the current UE 110 (block 506), if a Stale UE flag is set for an associated code word (checked in block 508), the link adaptation variable $\Delta_{dB}$ for the associated code word is reset (for example, to 0) (block 510) and the associated Stale UE flag is cleared (block 512). In some implementations, the link adaptation variable $\Delta_{dB}$ is reset on a conditional basis—for example, only if the link adaptation variable $\Delta_{dB}$ is positive.

In this exemplary embodiment, if no initial HARQ transmission has occurred for a code word for a configurable number of TTIs (that is, the corresponding link adaptation variable $\Delta_{dB}$ is stale) (checked in block 514 of FIG. 5B), the associated Stale UE flag is set (block 516), which causes the associated link adaptation variable $\Delta_{dB}$ to be reset at the next HARQ transmission.

In this exemplary embodiment, when a new CQI/PMI report is received after an RI change for the current UE 110 (block 518 of FIG. 5B), the Stale UE flags for the associated code words are set (block 516), which causes the associated link adaptation variables $\Delta_{dB}$ to be reset at the next HARQ transmission.

In this exemplary embodiment, the link adaptation variable $\Delta_{dB}$ for each code word is not reset upon a change in the cQSV for the corresponding UE 100 or solely in response to a PMI change.

At each HARQ transmission, if the associated link adaptation variables $\Delta_{dB}$ are not reset, the associated link adaptation variables $\Delta_{dB}$ are updated based on whether a HARQ ACK or NACK message is received.

As shown in FIG. 5A, if a HARQ ACK is received (checked in block 520), the associated link adaptation variables $\Delta_{dB}$ are increased by a first configurable amount ($\Delta_{ACK}$) (block 522). If instead a HARQ NACK is received, the associated link adaptation variables $\Delta_{dB}$ are decreased by a second configurable amount ($\Delta_{NACK}$) (block 524). In one example, $\Delta_{ACK}$ is set to 0.1 dB and $\Delta_{NACK}$ is set to 0.9 db. In some implementations, $\Delta_{ACK}$ and $\Delta_{NACK}$ can be updated dynamically.

In this exemplary embodiment, as shown in FIG. 5B, the associated link adaptation variables $\Delta_{dB}$ are adjusted (block 528) upon updating of the $SINR_{EST0}$ for the current UE 110 (for example, to reflect a change in CQI or SIRPL) (block 526). The amount of adjustment depends, in this embodiment, on the number of HARQ ACK or NACK based updates that have been made since the last adjustment. In one example, each adjusted link adaptation variable $\Delta_{dB\_new}$=that link adaptation variable before adjustment $\Delta_{dB\_old}$+f*X, where:

X=the $SINR_{EST0}$ for the link adaptation variable before adjustment $\Delta_{dB\_old}$ minus the $SINR_{EST0}$ for the adjusted link adaptation variable $\Delta_{dB\_adjusted}$; and f=the minimum of (a) the number of ACK/NACK based updates that have been made since the last adjustment divided by a configurable maximum number of ACK/NACK based updates that have been made since the last adjustment; or (b) 1.

In this exemplary embodiment, except for retransmissions, no rank override is used (even when there is little buffered data to transmit). The dynamic cQSV scheme that is used can be designed to minimize the conditions where a rank override may be necessary. If retransmission is required, the same transport format as the initial transmission is used, regardless of the prevailing rank at the time of retransmission.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system to provide wireless service comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) using a cell; wherein the controller is communicatively coupled to a core network of a wireless service provider; wherein the system is configured to transmit at least some data to each UE connected to the cell using a respective subset of the radio points; wherein the system is configured to determine the respective subset of the radio points for transmitting to each UE connected to the cell using a signature vector comprising a set of signal reception metrics, each signal reception metric associated with a respective one of the radio points and indicative of the reception of a signal transmitted from the respective UE at one of the radio points; and wherein the system is configured to do the following when each UE establishes a new connection with the cell: determine initial signal reception metrics for that UE; and if the system has a stored signature vector associated with that UE and that stored signature vector matches the initial signal reception metrics for that UE, initialize the signature vector for that UE using that stored signature associated with that UE.

Example 2 includes the system of Example 1, wherein the system is configured to store the signature vector associated with each UE connected to the cell when each connection that UE establishes with the cell is completed.

Example 3 includes the system of any of the Examples 1-2, wherein the system is configured to determine the initial signal reception metrics for each UE connected to the cell based on a LTE Physical Random Access Channel (PRACH) transmission from that UE.

Example 4 includes the system of any of the Examples 1-3, wherein the system is configured to update the signature vector for each UE connected to the cell based on LTE Sounding Reference Signals (SRS) transmitted by that UE.

Example 5 includes the system of any of the Examples 1-4, wherein the controller is communicatively coupled to the radio points using a switched ETHERNET network.

Example 6 includes a system to provide wireless service comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) using a cell; wherein the controller is communicatively coupled to a core network of a wireless service provider; wherein the system is configured to do the following for each UE connected to the cell: determine a signature vector comprising a set of signal reception metrics, each signal reception metric associated with a respective one of the radio points and indicative of the reception of a signal transmitted from the respective UE at one of the radio points; determine a respective minimum subset of the radio points for transmitting to that UE; determine a respective maximum subset of the radio points for transmitting to that UE; and determine a respective current subset of the radio points for transmitting to that UE based on, at least, the signature vector, the respective minimum subset of the radio points for transmitting to that UE, and the respective maximum subset of the radio points for transmitting to that UE; wherein the system is configured to, for each UE connected to the cell, expand the number of radio points in the minimum subset of the radio points if the respective signature vector for that UE has not been updated at least a predetermined number of times; and wherein the system is configured to wirelessly transmit at least some data to each UE connected to the cell using the respective current subset of the radio points determined for that UE based.

Example 7 includes the system of Example 6, wherein the system is configured to store the signature vector associated with each UE when each connection that UE establishes with the cell is completed; and wherein the system is configured to do the following when each UE establishes a new connection with the cell: determine initial signal reception metrics for that UE; and if the system has a stored signature vector associated with that UE and that stored signature vector matches the initial signal reception metrics for that UE, initialize the signature vector for that UE using that stored signature associated with that UE.

Example 8 includes the system of Example 7, wherein the system is configured to determine the initial signal reception metrics for each UE based on a LTE Physical Random Access Channel (PRACH) transmission from that UE.

Example 9 includes the system of any of the Examples 6-8, wherein the system is configured to update the signature vector for each UE based on LTE Sounding Reference Signals (SRS) transmitted by that UE.

Example 10 includes the system of any of the Examples 6-9, wherein the system is configured to expand the number of radio points in the minimum subset of the radio points for each UE using a phased approach if the respective signature vector for that UE has not been updated at least a predetermined number of times.

Example 11 includes the system of any of the Examples 6-10, wherein the controller is communicatively coupled to the radio points using a switched ETHERNET network.

Example 12 includes the system of any of the Examples 6-11, wherein the system is configured to do the following for each UE connected to the cell: determine a modulation and coding scheme (MCS) to use with each code word used for communications with said UE as a function of an estimate of a signal-to-interference-plus-noise ratio (SINR) and a link adaptation variable associated with each code word; and dynamically update each link adaptation variable for said UE based on hybrid automatic repeat request (HARQ) acknowledgments (ACKs) and negative acknowledgements (NACKs) received for said UE and the associated code word.

Example 13 includes a system to provide wireless service comprising: a controller; and a plurality of radio points; wherein each of the radio points is associated with at least one antenna and remotely located from the controller, wherein the plurality of radio points is communicatively coupled to the controller; wherein the controller and the plurality of radio points are configured to implement a base station in order to provide wireless service to a plurality of user equipment (UEs) using a cell; wherein the controller is communicatively coupled to a core network of a wireless service provider; wherein the system is configured to do the following for each UE connected to the cell: determine a signature vector comprising a set of signal reception metrics, each signal reception metric associated with a respective one of the radio points and indicative of the reception at one of the radio points of a signal transmitted from the respective UE; determine a respective minimum subset of the radio points for transmitting to that UE; determine a respective maximum subset of the radio points for transmitting to that UE; and determine a respective current subset of the radio points for transmitting to that UE based on, at least, the signature vector, the respective minimum subset of the radio points for transmitting to that UE, and the respective maximum subset of the radio points for transmitting to that UE; wherein the system is configured to, for each UE connected to the cell, update the respective current subset of the radio points used to transmit that UE based on at least one of the following: at least one ratio of the actual rate of throughput for at least one UE connected to the cell and an estimated rate of throughput for said at least one UE connected to the cell; at least one processing load at the radio points; and demand from at least one UE connected to the cell to use at least one radio point; and wherein the system is configured to wirelessly transmit at least some data to each UE connected to the cell using the respective current subset of the radio points determined for that UE.

Example 14 includes the system of Example 13, wherein the system is configured to, for each UE connected to the cell, expand the number of radio points in the respective current subset of the radio points for that UE if that UE experiences issues receiving transmissions using the current subset of the radio points.

Example 15 includes the system of any of the Examples 13-14, wherein the system is configured to store the current subset of the radio points for each UE when each connection that UE establishes with the cell is completed; and wherein the system is configured to, when each UE establishes a new connection with the cell, initialize the current subset of the radio points for that UE if there is a stored current subset of the radio points for that UE and if certain conditions are met.

Example 16 includes the system of any of the Examples 13-15, wherein the system is configured to, for each UE connected to the cell, expand the number of radio points in the minimum subset of the radio points if the respective signature vector for that UE has not been updated at least a predetermined number of times.

Example 17 includes the system of any of the Examples 13-16, wherein the system is configured to determine the initial signal reception metrics for each UE based on a LTE Physical Random Access Channel (PRACH) transmission from that UE.

Example 18 includes the system of any of the Examples 13-17, wherein the system is configured to update the signature vector for each UE based on LTE Sounding Reference Signals (SRS) transmitted by that UE.

Example 19 includes the system of any of the Examples 13-18, wherein the controller is communicatively coupled to the radio points using a switched ETHERNET network.

Example 20 includes the system of any of the Examples 13-19, wherein the system is configured to do the following for each UE connected to the cell: determine a modulation and coding scheme (MCS) to use with each code word used for communications with said UE as a function of an estimate of a signal-to-interference-plus-noise ratio (SINR) and a link adaptation variable associated with that code word; and dynamically update each link adaptation variable for said UE based on hybrid automatic repeat request (HARQ) acknowledgments (ACKs) and negative acknowledgements (NACKs) received for said UE and the associated code word.

What is claimed is:

1. A system to provide wireless service comprising:
   a controller; and
   a plurality of radio points;
   wherein each of the radio points is associated with a respective at least one antenna, wherein the plurality of radio points is communicatively coupled to the controller;
   wherein the system is configured to use the controller and the plurality of radio points to implement a base station in order to provide wireless service to a plurality of user equipment (UEs) using a cell;
   wherein the system is configured to do the following for each UE connected to the cell:
   determine a respective signature vector for that UE comprising a set of signal reception metrics determined for that UE, each signal reception metric associated with a respective one of the radio points;
   determine a respective minimum subset of the radio points for transmitting to that UE; and
   determine a respective current subset of the radio points for transmitting to that UE based on, at least, the signature vector and the respective minimum subset of the radio points for transmitting to that UE, the respective current subset for that UE having a respective number of radio points included therein;
   wherein the system is configured to, for each UE connected to the cell, expand the respective number of radio points in the respective minimum subset of the radio points for that UE if the respective signature vector for that UE has not been updated at least a predetermined number of times; and
   wherein the system is configured to wirelessly transmit respective data to each UE connected to the cell using the respective current subset of the radio points determined for that UE.

2. The system of claim 1, wherein the system is configured to store the respective signature vector associated with each UE when each connection that UE establishes with the cell is completed; and
   wherein the system is configured to do the following when each UE establishes a new connection with the cell:
   determine respective initial signal reception metrics for that UE; and
   if the system has a respective stored signature vector associated with that UE and that respective stored signature vector matches the respective initial signal reception metrics for that UE, initialize the respective signature vector for that UE using that respective stored signature associated with that UE.

3. The system of claim 2, wherein the system is configured to determine the respective initial signal reception metrics for each UE based on a Physical Random Access Channel (PRACH) transmission from that UE.

4. The system of claim 1, wherein the system is configured to update the respective signature vector for each UE based on Sounding Reference Signals (SRS) transmitted by that UE.

5. The system of claim 1, wherein the system is configured to expand the respective number of radio points in the respective minimum subset of the radio points for each UE using a phased approach if the respective signature vector for that UE has not been updated at least a predetermined number of times.

6. The system of claim 1, wherein the controller is communicatively coupled to the radio points using a switched ETHERNET network.

7. The system of claim 1, wherein the system is configured to do the following for each UE connected to the cell:
determine a respective modulation and coding scheme (MCS) to use with each code word used for communications with that UE as a function of an estimate of a signal-to-interference-plus-noise ratio (SINK) and a link adaptation variable associated with each code word; and
dynamically update a respective link adaptation variable for that UE based on hybrid automatic repeat request (HARQ) acknowledgments (ACKs) and negative acknowledgements (NACKs) received for that UE and the associated code word.

8. The system of claim 1, wherein the system is configured to do the following for each UE connected to the cell:
determine a respective maximum subset of the radio points for transmitting to that UE; and
wherein the respective current subset of the radio points for transmitting to each UE connected to the cell is determined based on, at least, the respective signature vector for that UE, the respective minimum subset of the radio points for transmitting to that UE, and the respective maximum subset of the radio points for transmitting to that UE.

9. The system of claim 1, wherein each of the radio points is remotely located from the controller.

10. The system of claim 1, wherein, for the respective signature vector for each UE connected to the cell, each signal reception metric of the respective signature vector is indicative of reception at the associated one of the radio points of a signal transmitted from that UE.

11. A system to provide wireless service comprising:
a controller; and
a plurality of radio points;
wherein each of the radio points is associated with a respective at least one antenna, wherein the plurality of radio points is communicatively coupled to the controller;
wherein the system is configured to use the controller and the plurality of radio points to implement a base station in order to provide wireless service to a plurality of user equipment (UEs) using a cell;
wherein the system is configured to do the following for each UE connected to the cell:
determine a respective signature vector for that UE comprising a set of signal reception metrics determined for that UE, each signal reception metric associated with a respective one of the radio points;
determine a respective minimum subset of the radio points for transmitting to that UE; and
determine a respective current subset of the radio points for transmitting to that UE based on, at least, the respective signature vector and the respective minimum subset of the radio points for transmitting to that UE, the respective current subset for that UE having a respective number of radio points included therein;
wherein the system is configured to, for at least one UE connected to the cell, update the respective current subset of the radio points used to transmit to said at least one UE based on at least one ratio of the actual rate of throughput for said at least one UE and an estimated rate of throughput for said at least one UE; and
wherein the system is configured to wirelessly transmit respective data to each UE connected to the cell using the respective current subset of the radio points determined for that UE.

12. The system of claim 11, wherein the system is configured to, for each UE connected to the cell, expand the respective number of radio points in the respective current subset of the radio points for that UE if that UE experiences issues receiving transmissions using the respective current subset of the radio points.

13. The system of claim 11, wherein the system is configured to store the respective current subset of the radio points for each UE when each connection that UE establishes with the cell is completed; and
wherein the system is configured to, when each UE establishes a new connection with the cell, initialize the respective current subset of the radio points for that UE if there is a respective stored current subset of the radio points for that UE and if certain conditions are met.

14. The system of claim 11, wherein the system is configured to, for each UE connected to the cell, expand the respective number of radio points in the respective minimum subset of the radio points for that UE if the respective signature vector for that UE has not been updated at least a predetermined number of times.

15. The system of claim 11, wherein the system is configured to determine respective initial signal reception metrics for each UE based on a Physical Random Access Channel (PRACH) transmission from that UE.

16. The system of claim 11, wherein the system is configured to update the respective signature vector for each UE based on Sounding Reference Signals (SRS) transmitted by that UE.

17. The system of claim 11, wherein the controller is communicatively coupled to the radio points using a switched ETHERNET network.

18. The system of claim 11, wherein the system is configured to do the following for each UE connected to the cell:
determine a respective modulation and coding scheme (MCS) to use with each code word used for communications with that UE as a function of an estimate of a signal-to-interference-plus-noise ratio (SINK) and a link adaptation variable associated with that code word; and
dynamically update a respective link adaptation variable for that UE based on hybrid automatic repeat request (HARQ) acknowledgments (ACKs) and negative acknowledgements (NACKs) received for that UE and the associated code word.

19. The system of claim 11, wherein the system is configured to do the following for each UE connected to the cell:

determine a respective maximum subset of the radio points for transmitting to that UE; and wherein the respective current subset of the radio points for transmitting to each UE connected to the cell is determined based on, at least, the respective signature vector for that UE, the respective minimum subset of the radio points for transmitting to that UE, and the respective maximum subset of the radio points for transmitting to that UE.

20. The system of claim 11, wherein each of the radio points is remotely located from the controller.

21. The system of claim 11, wherein, for the respective signature vector for each UE connected to the cell, each signal reception metric of the respective signature vector is indicative of reception at the associated one of the radio points of a signal transmitted from that UE.

* * * * *